(12) United States Patent
Scott

(10) Patent No.: US 8,578,694 B2
(45) Date of Patent: Nov. 12, 2013

(54) CONNECTOR LINK METHOD AND APPARATUS

(75) Inventor: Kenton G. Scott, Portland, OR (US)

(73) Assignee: Peerless Chain Company, Winona, MN (US)

(*) Notice: Subject to any disclaimer, the term of this patent is extended or adjusted under 35 U.S.C. 154(b) by 0 days.

(21) Appl. No.: 13/811,723

(22) PCT Filed: Jul. 20, 2011

(86) PCT No.: PCT/US2011/044713
§ 371 (c)(1),
(2), (4) Date: Jan. 23, 2013

(87) PCT Pub. No.: WO2012/012556
PCT Pub. Date: Jan. 26, 2012

(65) Prior Publication Data
US 2013/0118144 A1    May 16, 2013

Related U.S. Application Data

(60) Provisional application No. 61/367,339, filed on Jul. 23, 2010.

(51) Int. Cl.
*A44B 13/02* (2006.01)
*F16B 45/02* (2006.01)

(52) U.S. Cl.
USPC ............. 59/93; 59/85; 24/598.1; 24/600.1

(58) Field of Classification Search
USPC ......... 59/85, 86, 93; D8/356; 24/598.1, 600.1
See application file for complete search history.

(56) References Cited

U.S. PATENT DOCUMENTS

| 841,706 | A | * | 1/1907 | Morden ........................ 402/35 |
| 1,165,606 | A | * | 12/1915 | King ............................ 24/599.9 |
| 1,576,197 | A | * | 3/1926 | Kuffel et al. ................ 294/82.19 |
| 1,650,802 | A | * | 11/1927 | McLoughlin ................ 24/577.1 |
| 4,471,511 | A | * | 9/1984 | Phipps ........................ 294/82.33 |
| 5,765,891 | A | * | 6/1998 | Fredriksson ................ 294/82.11 |
| 5,940,943 | A | * | 8/1999 | Kloster ........................ 24/588.1 |
| 6,336,260 | B1 | * | 1/2002 | Mauthner ..................... 24/376 |
| 6,907,645 | B2 | | 6/2005 | Jenson et al. |
| 6,912,836 | B2 | * | 7/2005 | Hsu .............................. 59/85 |
| D550,552 | S | * | 9/2007 | Oas .............................. D8/356 |
| D630,932 | S | * | 1/2011 | Shumway ..................... D8/356 |
| D646,556 | S | * | 10/2011 | Kelleghan ..................... D8/356 |
| 2003/0056340 | A1 | | 3/2003 | Benecke |

FOREIGN PATENT DOCUMENTS

KR    10-0312239 B1    2/2002

OTHER PUBLICATIONS

PCT International Searching Authority/Korea—PCT/US2011/044713—International Search Report, Feb. 9, 2012.

* cited by examiner

*Primary Examiner* — David B Jones
(74) *Attorney, Agent, or Firm* — Moore & Hansen, PLLC

(57) ABSTRACT

Embodiments herein relate to the general art of connector links, and to the particular field of coupling links for coupling to one or more chain links. Particular embodiments include coupling links having a body with a central portion that has an aperture passing therethrough, a closed first end that is integral, and a second end that has an opening, and a retaining member in the form of a removable, deformable, or pivotable member that may selectively provide a closure to the opening. Other embodiments include retaining members on both ends of the coupling link.

18 Claims, 25 Drawing Sheets

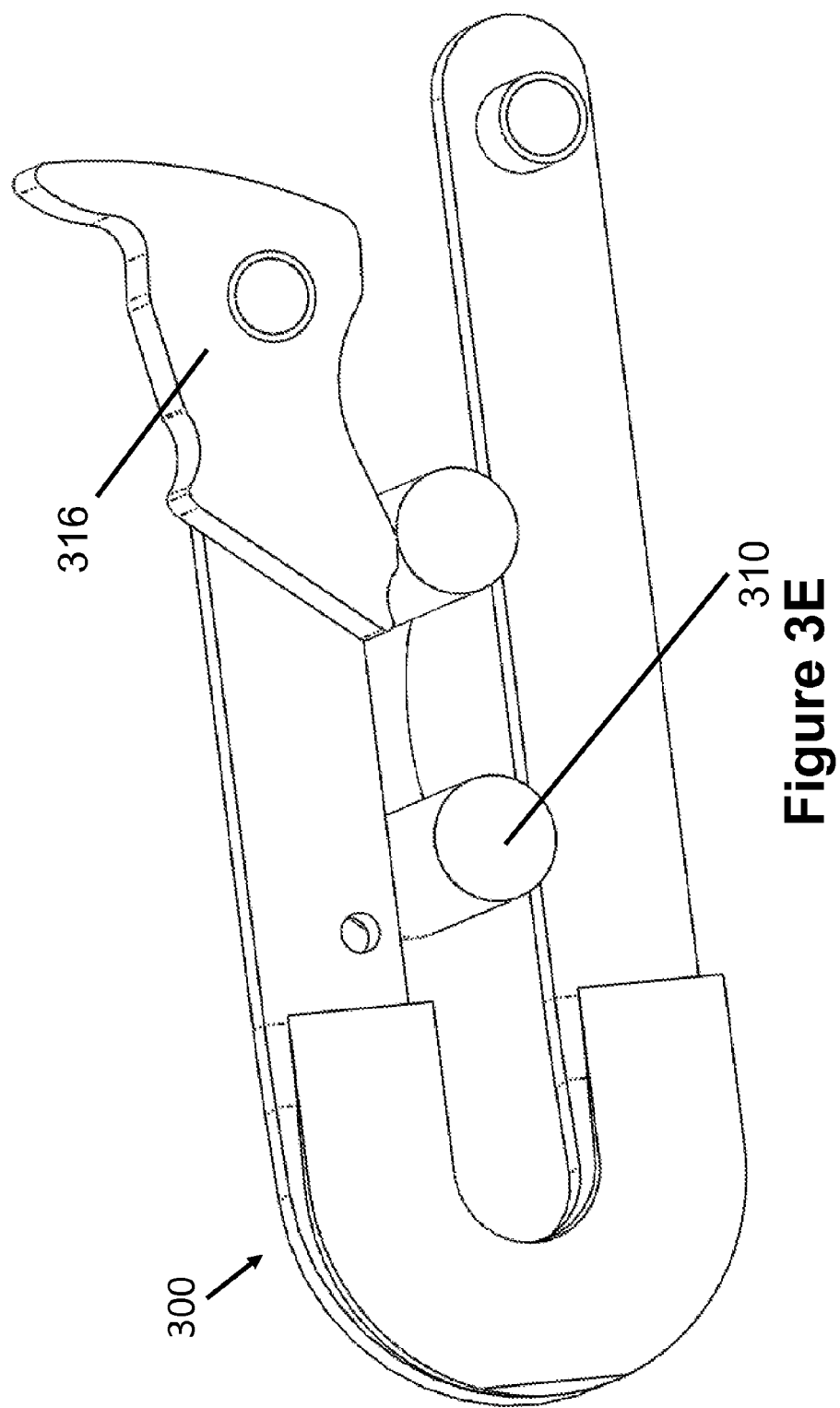

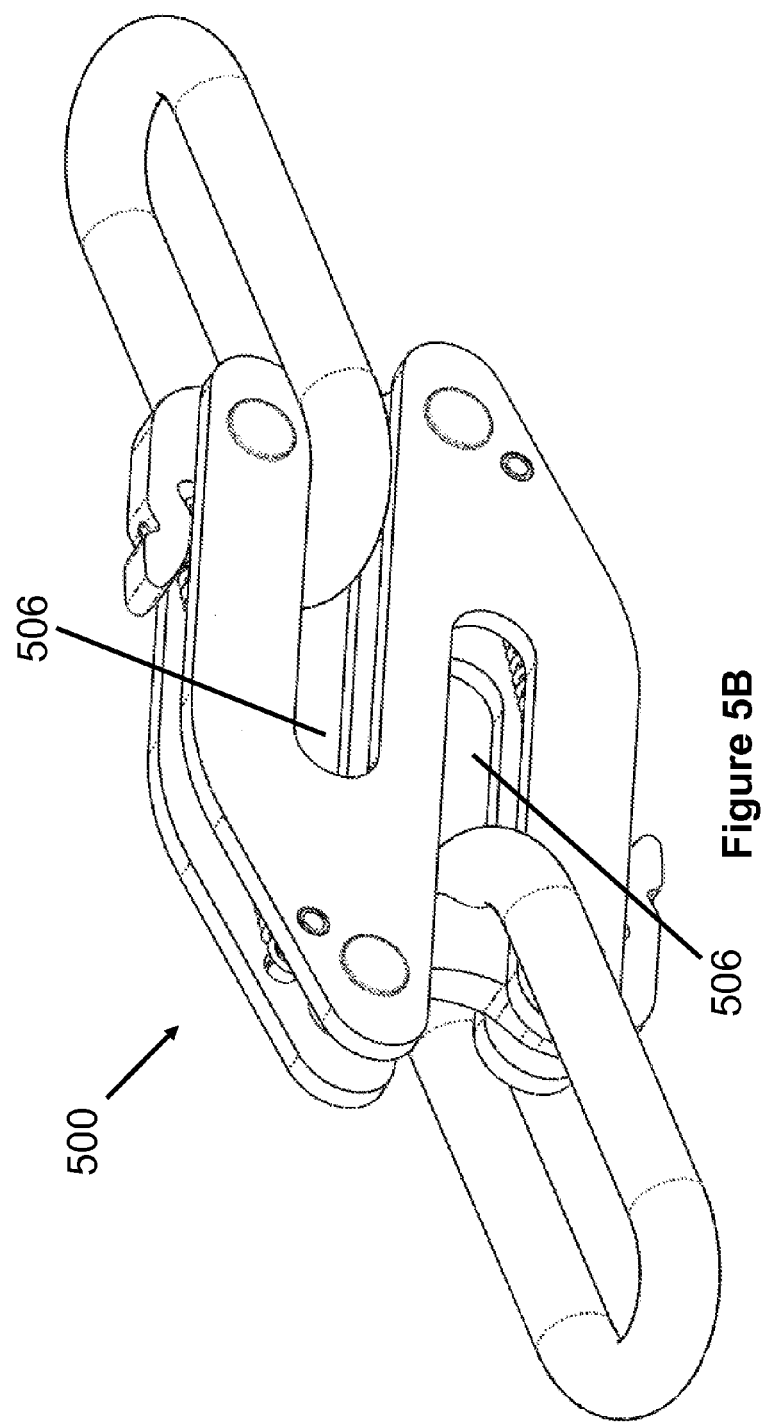

ND APPARATUS

CROSS REFERENCE TO RELATED APPLICATION

The present application is related to U.S. Provisional patent application No. 61/367,339, filed Jul. 23, 2010, entitled "Connector Link Method and Apparatus," the entire disclosure of which is hereby incorporated by reference in its entirety.

TECHNICAL FIELD

Embodiments disclosed herein relate to connector links, and in particular to coupling links for use in coupling to one or more chain links.

BACKGROUND

C links, clips, and other coupling links are often used to couple to one or more chain links. However, conventional C clips tend to fail under high tension loads because they have an opening that tends to pull apart when tension is applied to the ends of the link. Often, when a latch is used to close a C-link, the tension applied by adjacent links is great enough that it will overcome the latch connection of the latch beam and cause the link to open. Further, the latch beams of conventional C links and snap links tend to protrude outside of the body periphery, thus providing an easy hang-up point or catch for foreign objects to engage, resulting in a premature opening of the latch or a destruction of the latch altogether.

BRIEF DESCRIPTION OF THE DRAWINGS

Embodiments will be readily understood by the following detailed description in conjunction with the accompanying drawings. Embodiments are illustrated by way of example and not by way of limitation in the figures of the accompanying drawings.

FIGS. 3A through 3F illustrate perspective views of the steps involved with uncoupling an exemplary two-piece connector link from an exemplary straight link, all in accordance with various embodiments;

FIGS. 5A and 5B illustrate a side view (FIG. 5A) of another example of a double-ended connector link in a closed position, and a perspective view (FIG. 5B) of the same double-ended connector link in a closed position with two chain links attached, in accordance with various embodiments;

DETAILED DESCRIPTION OF EMBODIMENTS

Figure 1A:
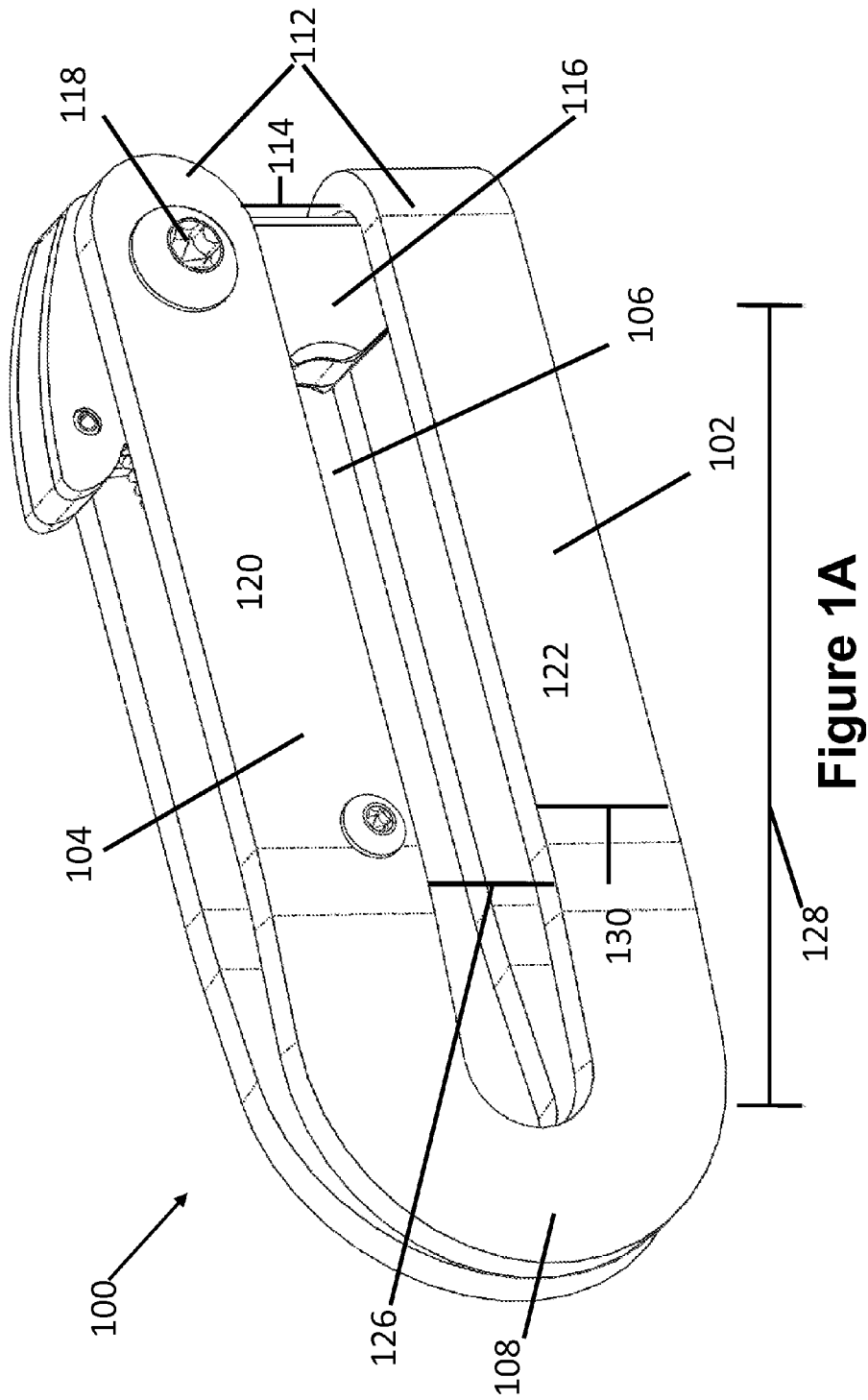
FIG. 1A illustrates a perspective view of an exemplary connector link in a closed position, in accordance with various embodiments.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

For the purposes of the description, a phrase in the form "N/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous.

Embodiments of the present disclosure pertain to a coupling link that may be adapted to couple to one or more links of chain or other binding or coupling components. The coupling link may be quickly and easily coupled to and decoupled from other links without the use of tools, yet it still may withstand greater tension loads than conventional C links without deforming or opening. In various embodiments, the coupling link may include a retaining member (also referred to as a latch member and/or trigger member herein)

at one or more ends of an elongated link that is adapted to receive tension from a chain links or other members coupled thereto. In various embodiments, pressure applied to the retaining member and or to the coupling link ends may increase the strength of the coupling link closure. Embodiments of the coupling link also may have a low profile, for instance, with few protruding parts to hang up on adjacent links or machinery, which may allow the coupling link to be used in a variety of low-clearance environments. Further, some low-profile embodiments of the coupling link may help prevent the premature opening of the latch member due to engagement with the surrounding environment.

In general, the coupling links described herein have significantly improved strength as compared to conventional coupling links. In various embodiments, even the largest and strongest conventional C links made from expensive high tensile strength alloy steel that close with a spring-loaded clip tend to fail catastrophically under load. Additionally, conventional C links typically are only a fraction of the strength of the chain links that they connect. By comparison, the coupling links of the present disclosure may withstand loads greater than the links they connect, even when constructed from less expensive and more common materials than comparable C links.

Embodiments of the present disclosure provide significant improvements in safety and security compared to the existing state of the art represented by conventional C link couplers, which rely almost entirely on the strength of the particular material used for their construction. In conventional C links, when the load reaches the material's maximum strength, the C link couplers yield and open, resulting in a failure of the connection. By contrast, the connector links described herein may withstand much higher loads without failure because the retaining or latch members may be configured to increase the holding power as the loads upon them increase.

Embodiments of the coupling links disclosed herein may be configured with materials that meet or exceed the strength of the links they are connecting, except in cases where the connecting members are intentionally designed to yield to prevent the chain links themselves from catastrophic failure. Even in embodiments designed to yield at a predetermined load force, the coupling links may yield and stretch to a considerable degree before total failure, providing an additional layer of safety and permitting a wider variety of applications.

In various embodiments, the coupling link may include sufficient clearance between the closed end of the coupling link and the arc traveled by the tip of the retaining member to allow both opposing sides of a chain link to pass between the arc/tip of the retaining member and the closed end of the connector link when the retaining member is in an open position, thus allowing easy decoupling of the chain link from the coupling link.

Figure 1B:
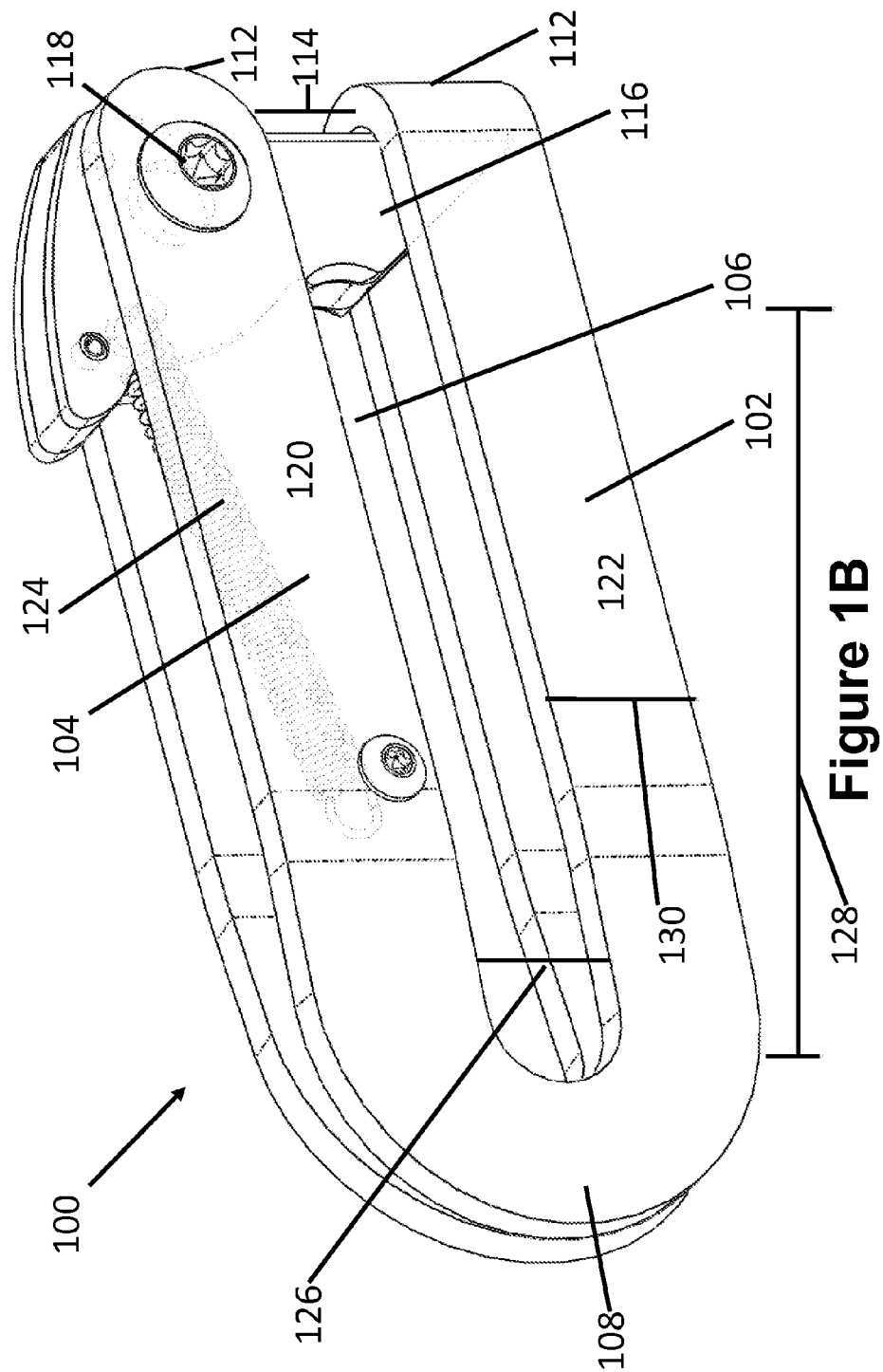
FIG. 1B illustrates a transparent view of an exemplary connector link, in accordance with various embodiments.
Figure 2A:
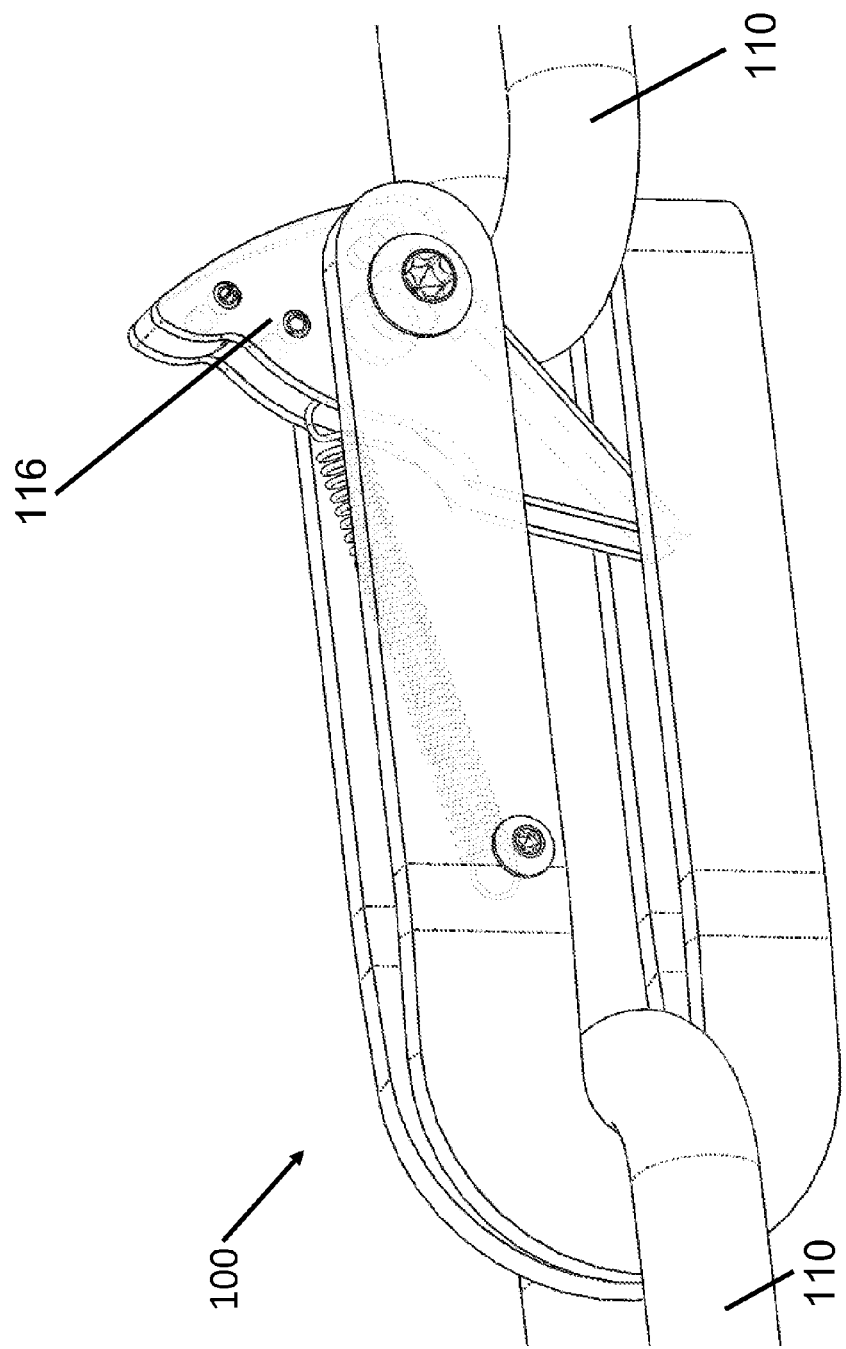
FIGS. 2A through 2H illustrate perspective views of the steps involved with coupling and uncoupling an exemplary one-piece connector link to an exemplary straight link, all in accordance with various embodiments.
Figure 2B:
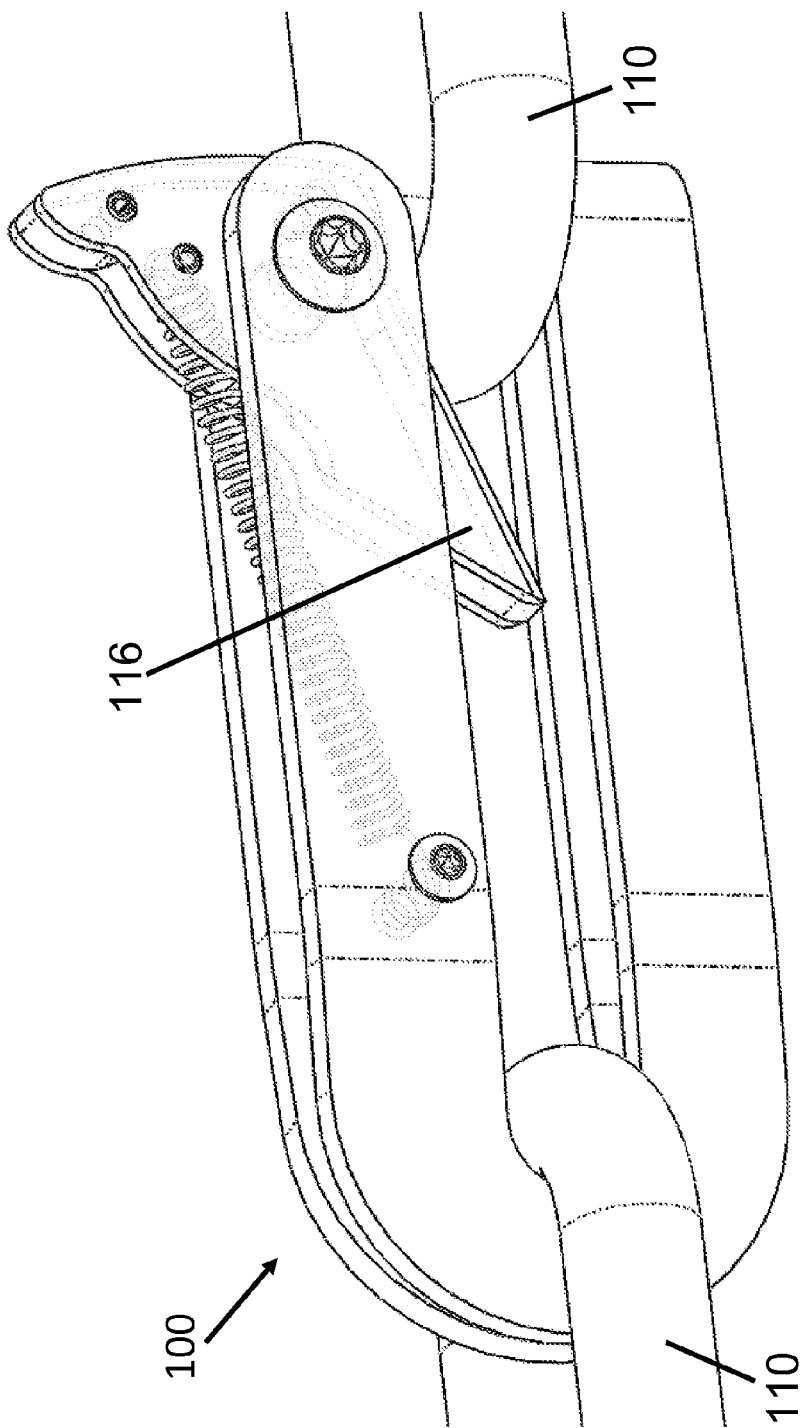
Figure 2C:
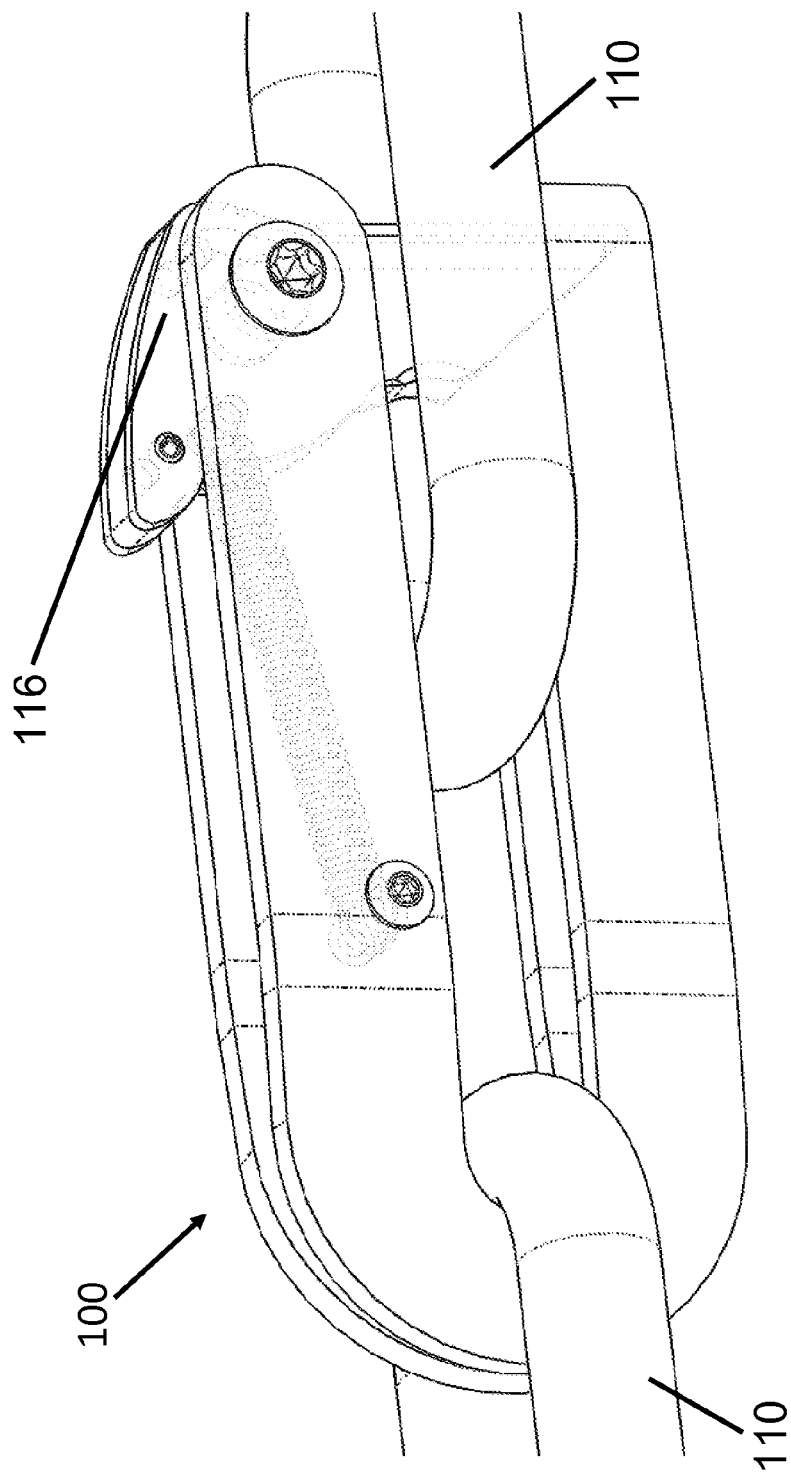
Figure 2D:
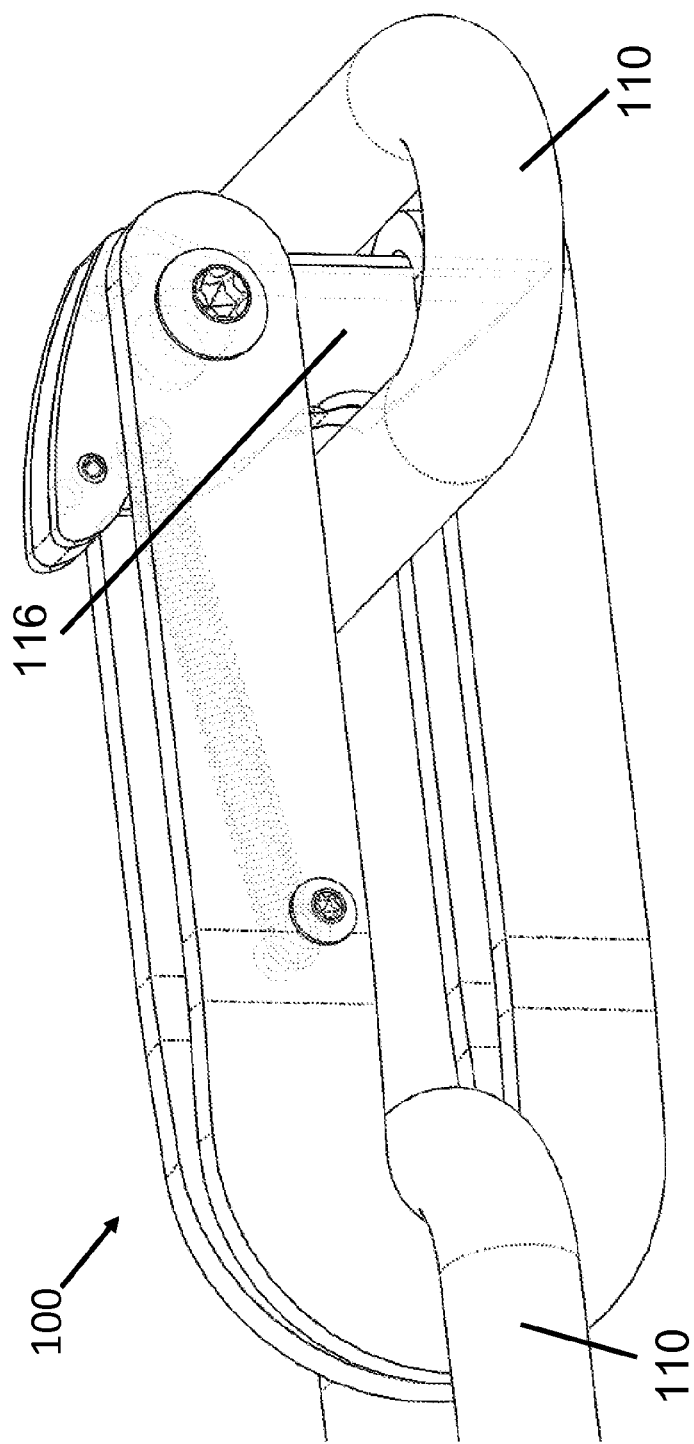
Figure 2E:
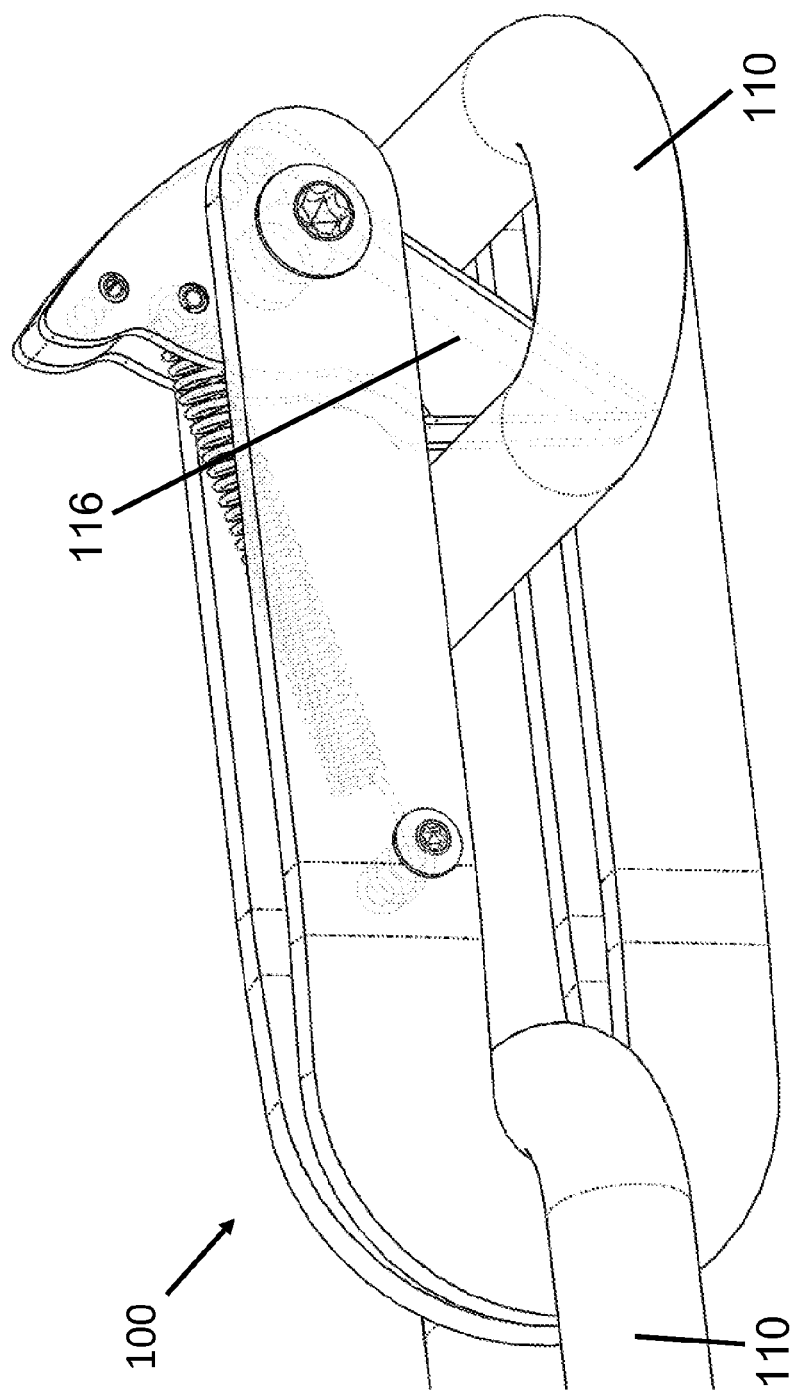
Figure 2F:
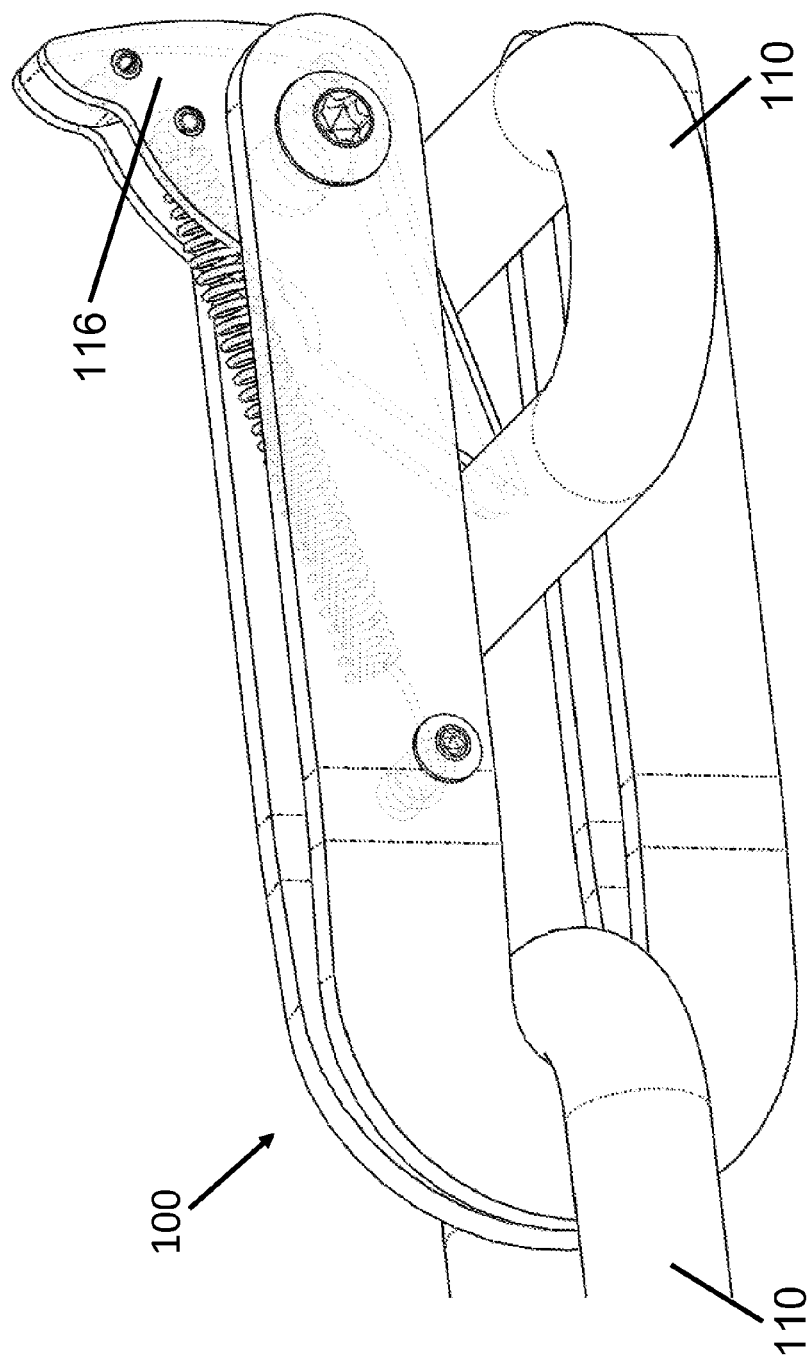
Figure 2G:
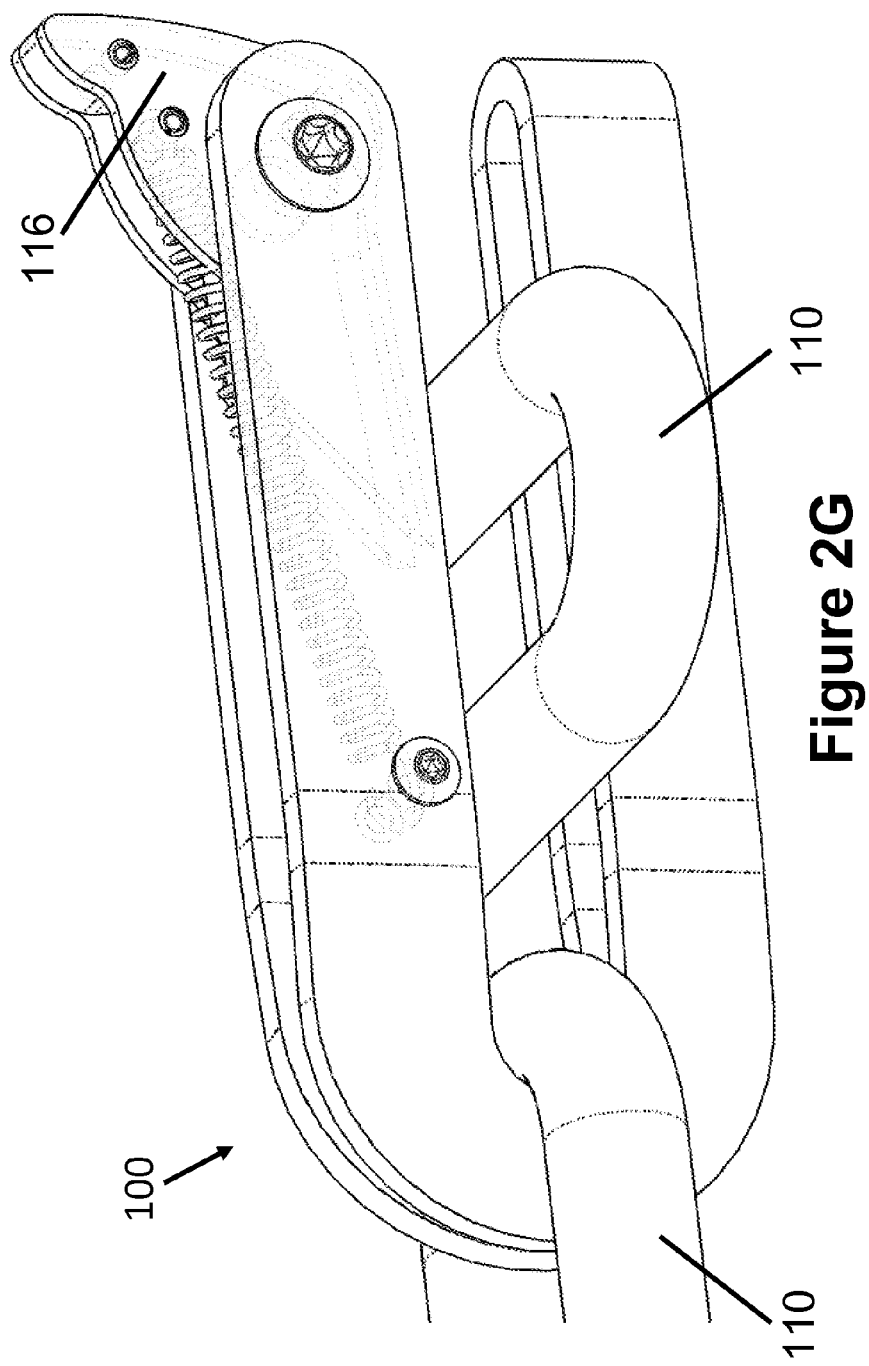
Figure 2H:
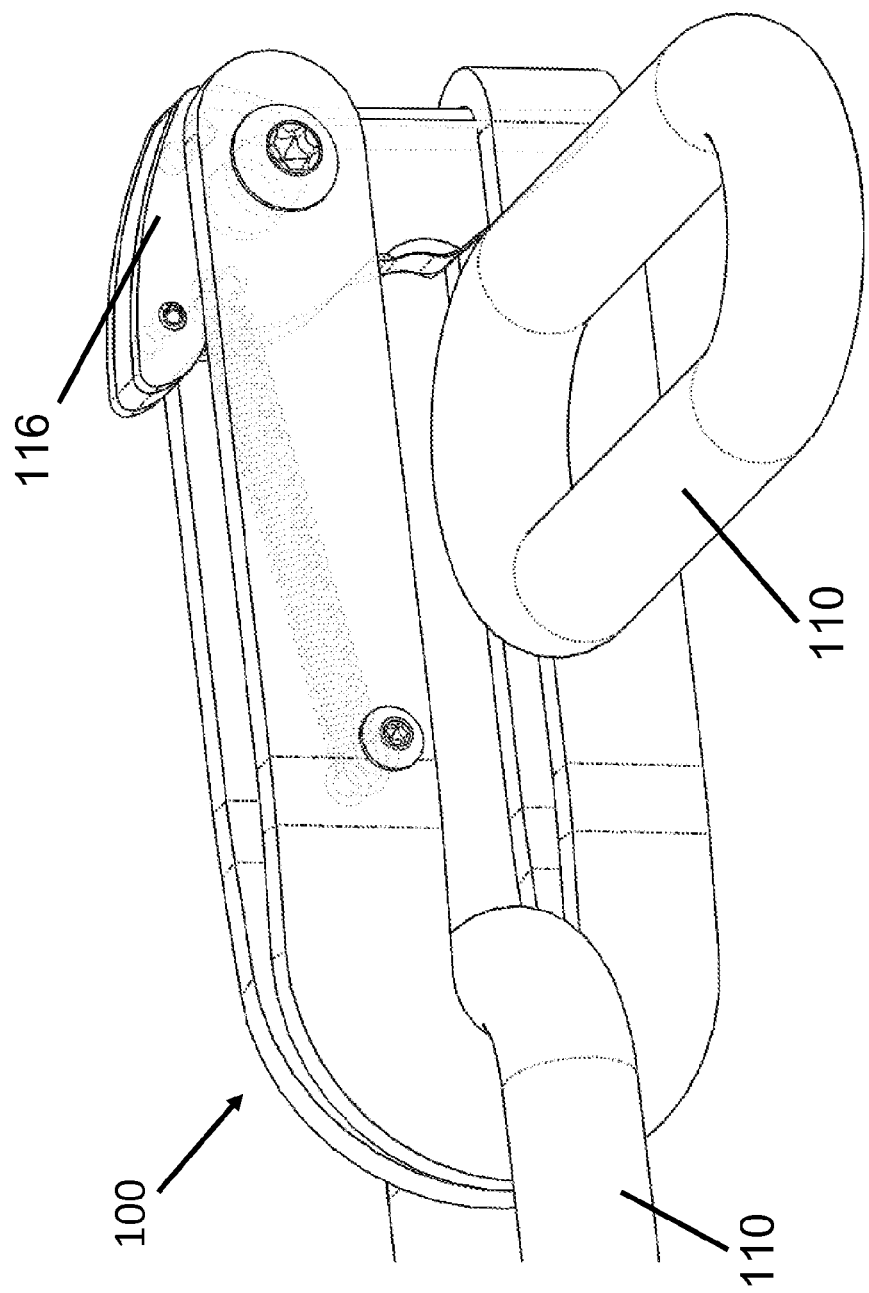
Figure 3A:
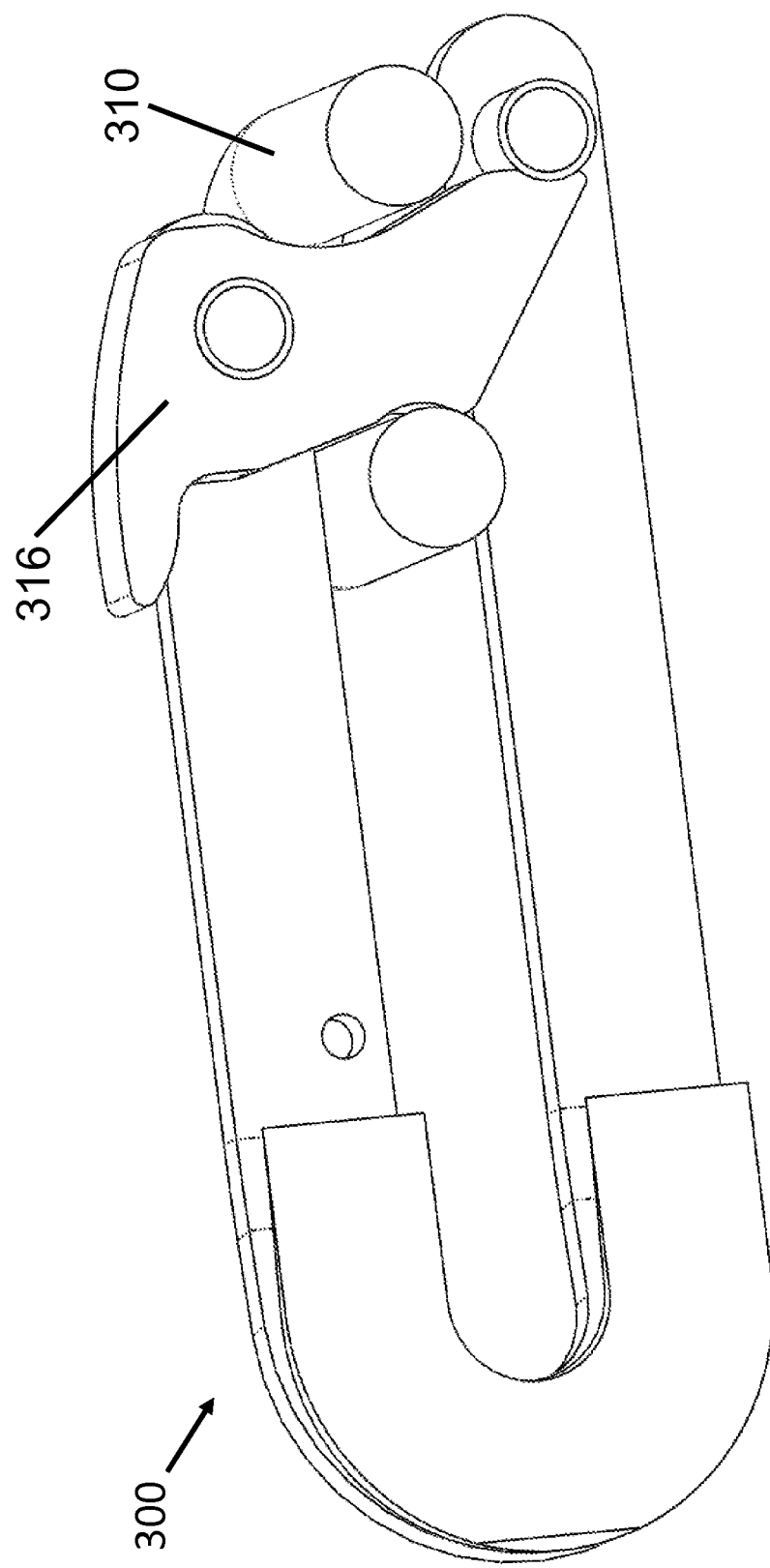
Figure 3B:
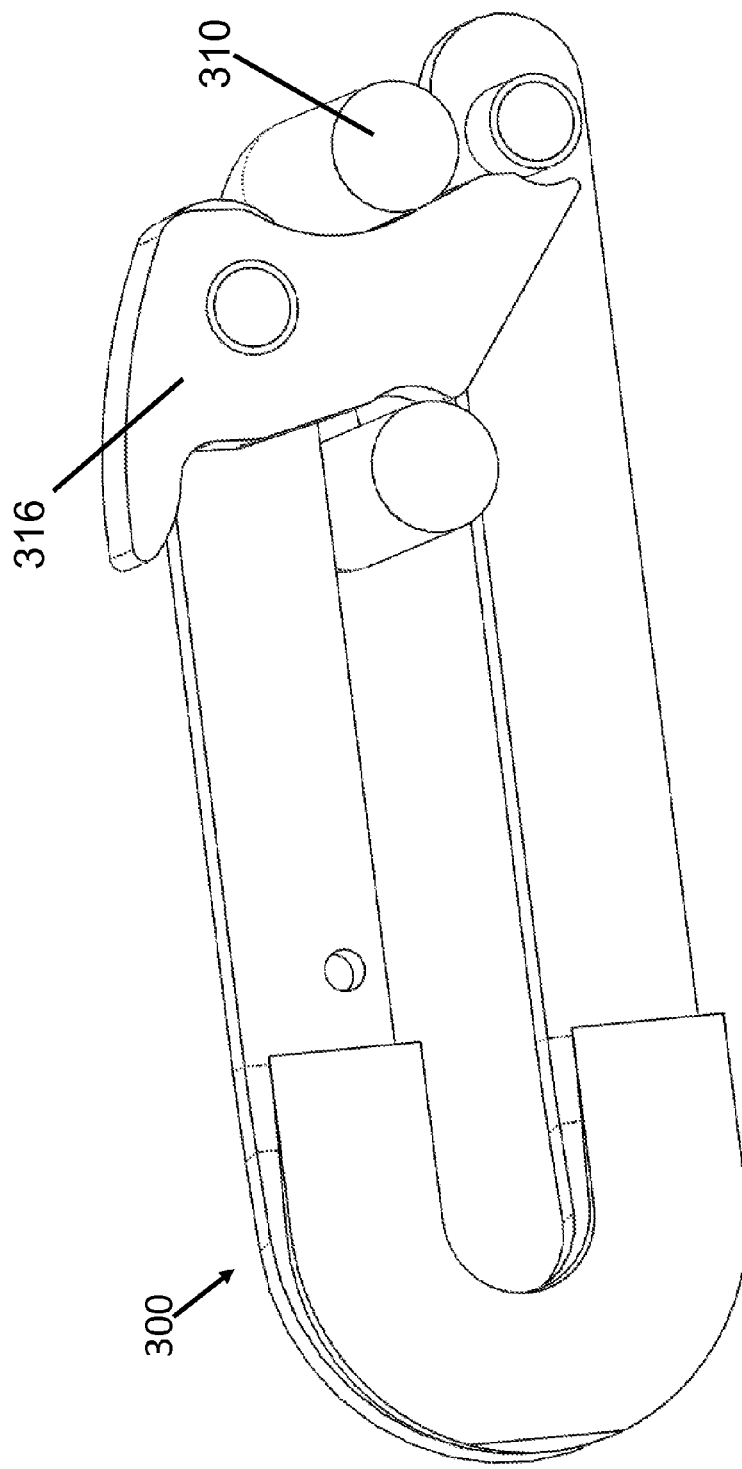
Figure 3C:
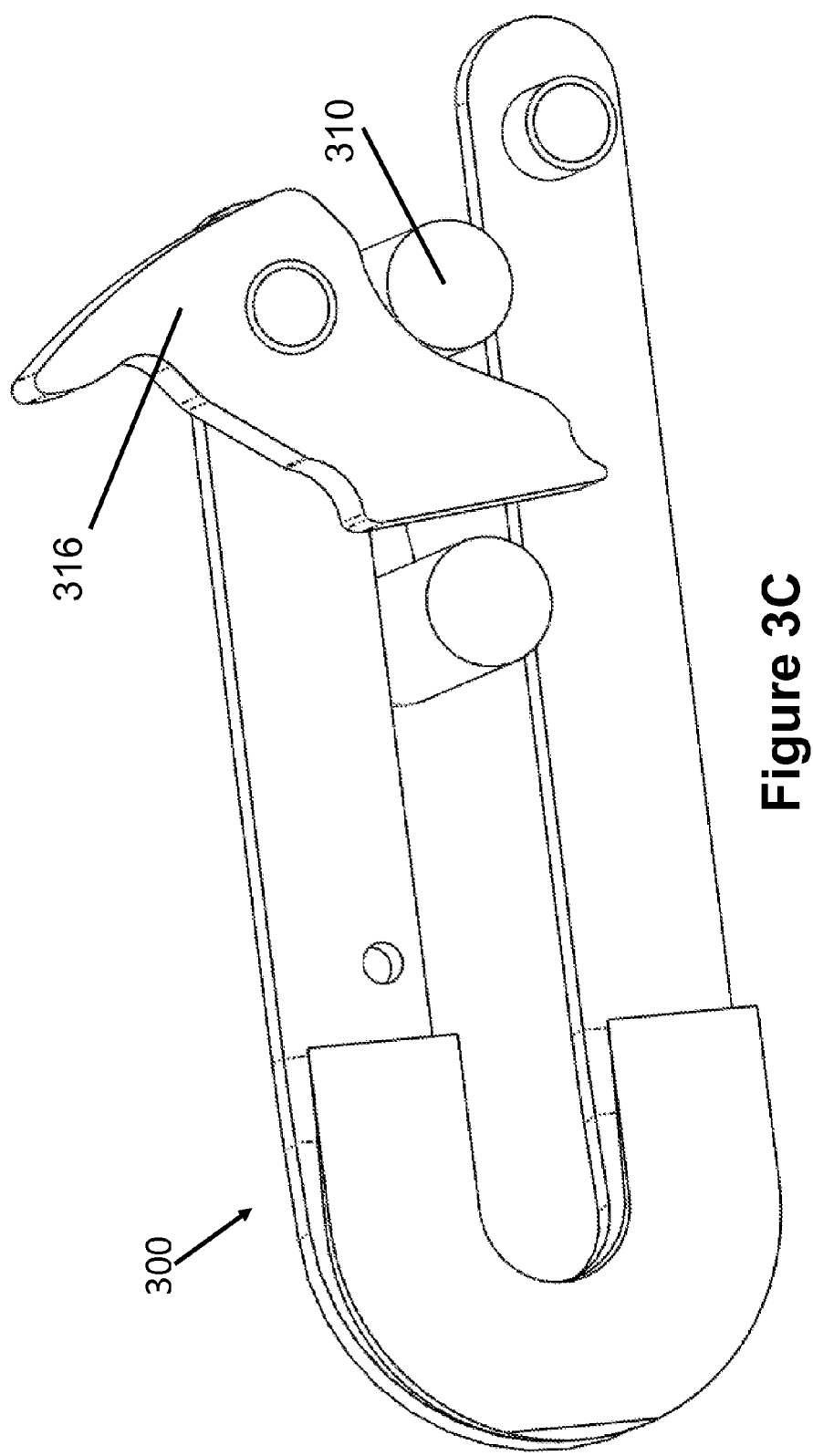
Figure 3D:
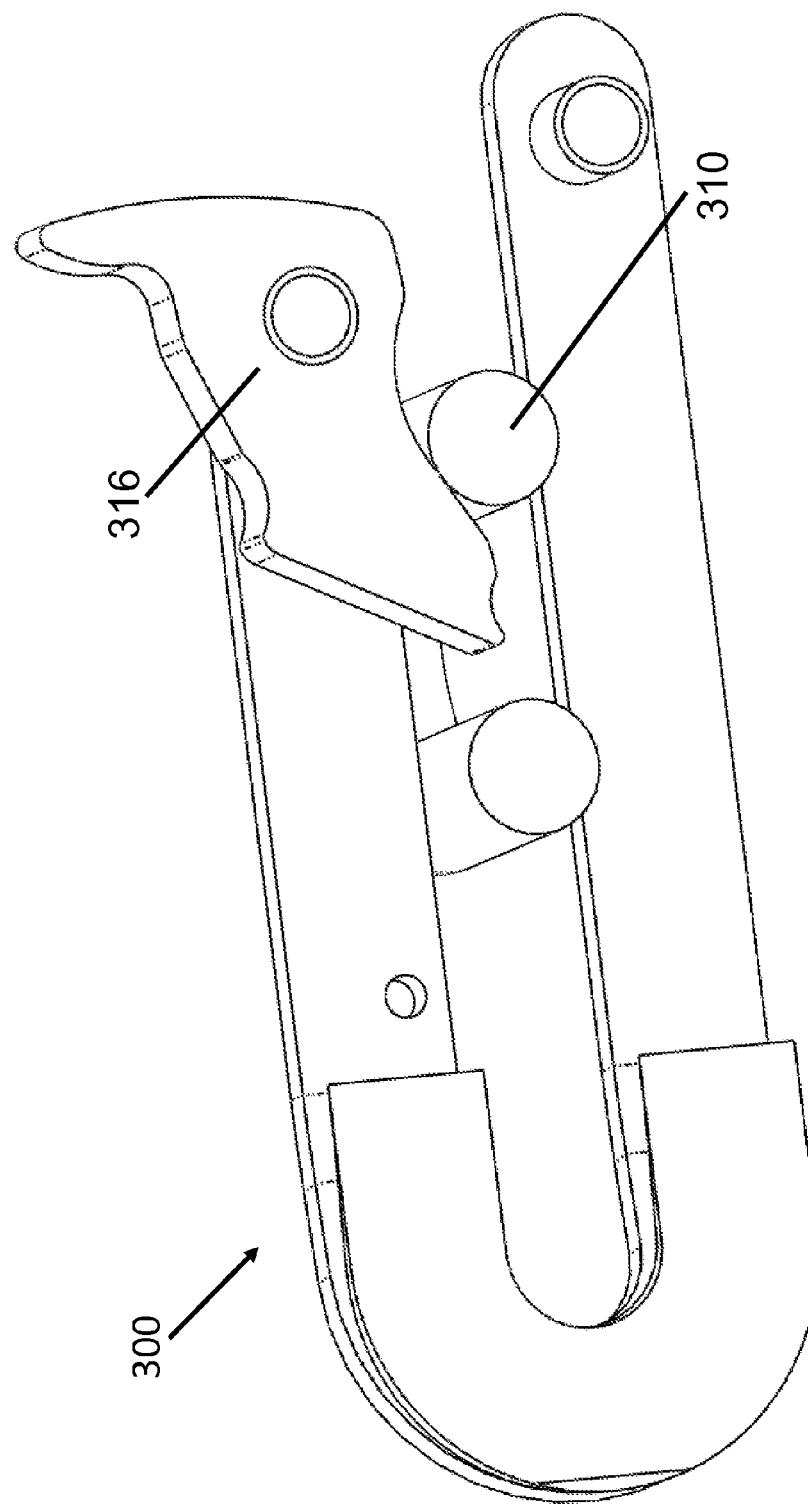
Figure 3F:
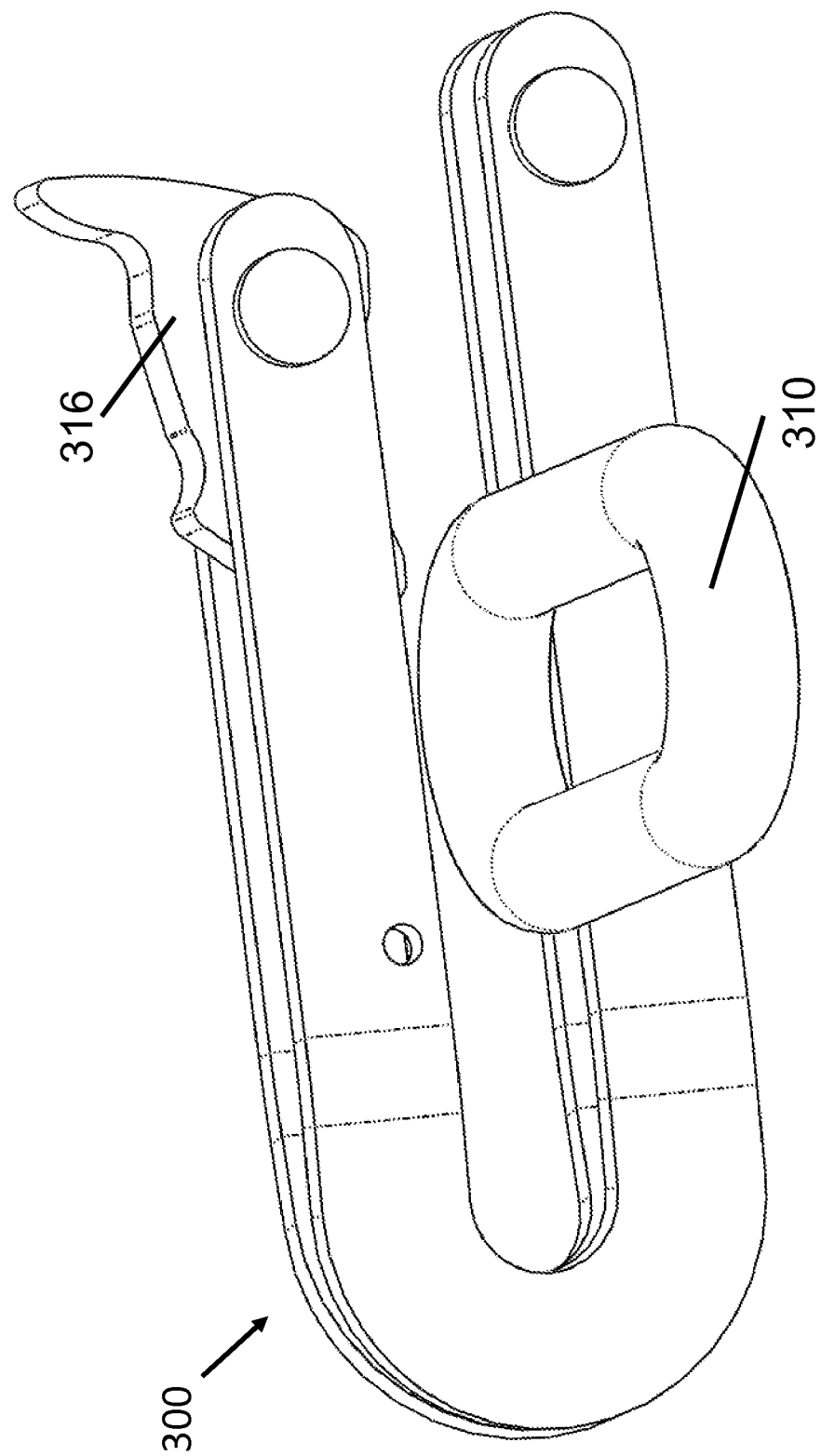

FIGS. 1A and 1B illustrate a coupling link in accordance with various embodiments. Coupling link 100 may include a body portion 102 having a central portion 104 that has an aperture 106 passing there through. In one embodiment, a first end 108 of body portion 102 is integral, and thus provides a closure to first end 108 of aperture 106 to which, for example, may engage and retain one end of a chain link. A second end 112 may include an opening 114 and a retaining member 116 that may selectively provide a closure to opening 114 at second end 112 of aperture 106, thus selectively engaging and retaining, for example, one end of a different chain link. Retaining member 116 may be a removable, deformable, pivotable, etc. member that may be actuated between an open position and a closed position.

In the illustrated embodiment, retaining member 116 may be pivotally attached to body portion 102 such that it may pivot relative to aperture 106 and generally across opening 114, thereby opening and closing second end 112. For example, in some embodiments, retaining member 116 may pivot in a generally inward direction relative to aperture 106, such that the tip of retaining member 112 may travel in an arc between the open and closed positions about a pivot point 118. In some embodiments, pivot point 118 may be positioned at various locations on body portion 102, and in various embodiments may be in an upper portion 120 or lower portion 122 of second end 112.

In various embodiments, retaining member 116 may be biased such that it may maintain a closed position unless a force overcomes the bias, thereby pivoting retaining member 116 along an arc relative to opening 114 in body portion 102. In some embodiments, the biasing force may be a spring 124 coupled between an upper portion of the retaining member and body 112. The biasing force may be a bias member such as a flat spring, coil spring, clock spring, magnet, elastomer, or other device that may impart a bias to the retaining member.

In various embodiments, body portion 102 may be generally oblong in shape, wherein aperture 106 may have an aperture height 126 that is less generally than the overall width 128 of body 102, and wherein retaining member 116 is adapted to receive tension from a coupled link when in the closed position. In various embodiments, the height of opening 114 and the aperture height 126 may be greater than the diameter (in the case of a cylindrical body chain) or minimum thickness (of a square or other geometrically configured chain) of a corresponding chain link configured to couple to coupling link 100. In such embodiments, when a chain link is pushed against retaining member 116 and overcomes the bias force, retaining member 116 may pivot relative to aperture 106 and allow the link to pass at least partially into aperture 106. The biased retaining member 116 may then close, thereby coupling the chain link to the coupling link 100 in a secure manner, and thus allowing the chain to impart a tension load on retaining member 116.

Referring to FIGS. 1A and 1B, in various embodiments, to remove or decouple the chain link, the link need only be positioned such that the shortest distance of the chain link opening is positioned parallel to the longitudinal axis of aperture 106 (which when using a typical oblong chain link would require turning the link generally perpendicular to the longitudinal axis of aperture 106). In various embodiments, the link may then be moved generally in the direction of the longitudinal axis of aperture 106 towards first end 108. In some embodiments, one side of a chain link body may push against retaining member 116 and overcome the bias force applied to retaining member 116 such that it passes by the distal tip of retaining member 116 through opening 114 at second end 112 and into aperture 106. This will leave the link of a chain disposed in aperture 106, such that it may be removed by pulling the link in a direction transverse to the longitudinal axis of body aperture 106, which in turn may decouples the chain link from coupling link 100. Specific examples of this procedure are shown in FIGS. 2 and 3. FIGS. 2A through 2H illustrate the steps involved with coupling and uncoupling an exemplary one-piece connector link 100 to an exemplary straight link 110 via retaining member 116, and FIGS. 3A through 3F illustrate the steps involved with uncoupling an exemplary two-piece connector link 300 from straight link 310 via retaining member 316.

Referring again to FIGS. 1A and 1B, in various embodiments, the minimum distance between the closed first end 108 of coupling link 100 (e.g., the closed end of aperture 106) and the arc traversed by the distal tip of retaining member 116 may be such that both sides of a coupled chain link 110 may pass by the arc into aperture 106. Further, in some embodiments, the largest body height or thickness 130 of body portion 102 and/or retaining member 116 may be less than the width of the smallest opening distance (e.g., the minimum diameter of the aperture) of chain link 110 such that chain link 110 may freely move around various parts of coupling link 100. In other embodiments, a portion of the largest body height or thickness 130 of body portion 102 and/or retaining member 116 may be configured to be greater than the smallest opening distance (e.g., smallest aperture diameter) of chain link 110, or may be otherwise configured to constrain the motion of chain link 110, for instance, to retain chain link 110 in a particular position with respect to coupling link 100. In some examples, constraining the movement of the captured link 110 may be useful, for instance, in preventing tangling and catching of the links. In various embodiments, body portion 102 may include other shapes besides oblong, such as circular, triangular, or other geometrical or irregular configurations.

While body portion 102 may be formed of a variety of materials having various configurations, in various embodiments, body portion 102 may be made out of a stamped, flat steel that can be generally formed into the desired shape (e.g., oblong as illustrated). The improved strength characteristics of coupling link 100 thus may allow for a milder steel or lighter weight material to be used, while still achieving similar tension strength characteristics as would be possible with a solid link or a specially heat treated link. In the example illustrated in FIGS. 1A and 1B, closed first end 108 of coupling link 100 may be generally pinched together to form a general taper in body portion 102, for example beginning from an area near opening 114 or second end 112 of coupling link 100, and tapering towards closed first end 108. In various embodiments, this taper may help to provide increased strength characteristics for the link. For instance, in some embodiments, when tension is applied to closed first end 108 and retaining member 116 by opposing chain links, body portion 102 may tend to further pinch retaining member 116 against body portion 102, thereby enhancing the overall strength characteristics of coupling link 100, keeping retaining member 116 in a closed position, and better distributing the load across body portion 102 compared to conventional C links. In other embodiments, this taper may not be present, and one or more spacers (not shown) may be included.

Figure 4:
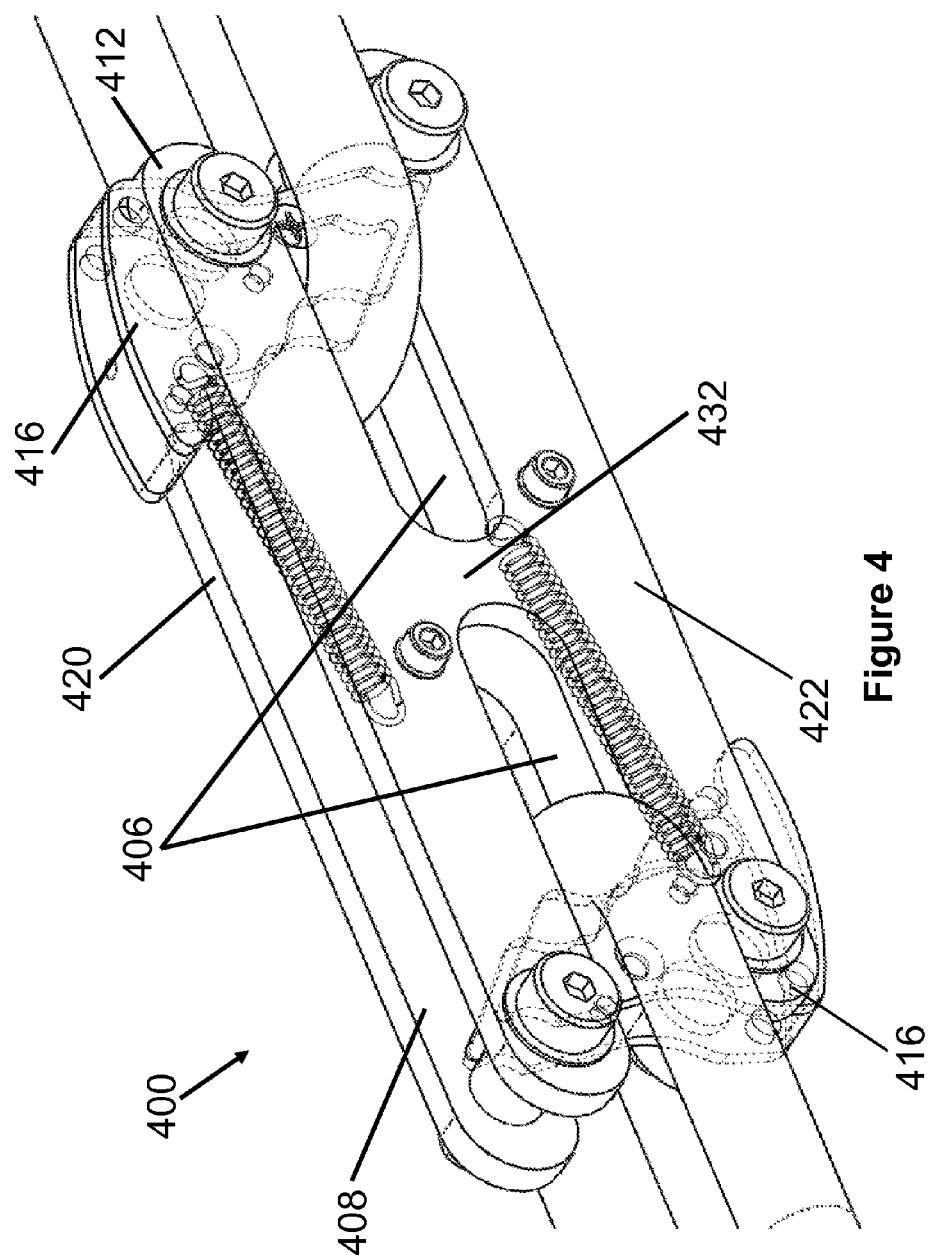
FIG. 4 illustrates a perspective view of an exemplary double-ended connector link in a closed position with two chain links attached, in accordance with various embodiments.

Some embodiments of the coupling link may be double-ended, having retaining members on both ends of the coupling link. FIG. 4 illustrates a perspective view of an exemplary double-ended connector link in a closed position with two chain links attached, in accordance with various embodiments. As illustrated in FIG. 4, in some embodiments, retaining members 416 may be positioned at both the first end 408 and the second end 412 of the coupling link 400 to allow multiple points of interconnection or access to aperture 406. In such embodiments, one or more bridging members 432 generally may be disposed between the upper portion 420 and lower portion 422 of aperture 406 to ensure stability of the body portion 402. In other embodiments, even when only a singe retaining member 416 is used, one or more bridging members 432 or spacers may be disposed about one or more portions of body portion 402 to maintain a desired spacing between the upper portion 420 and lower portion 422 of aperture 406.

Figure 5A:
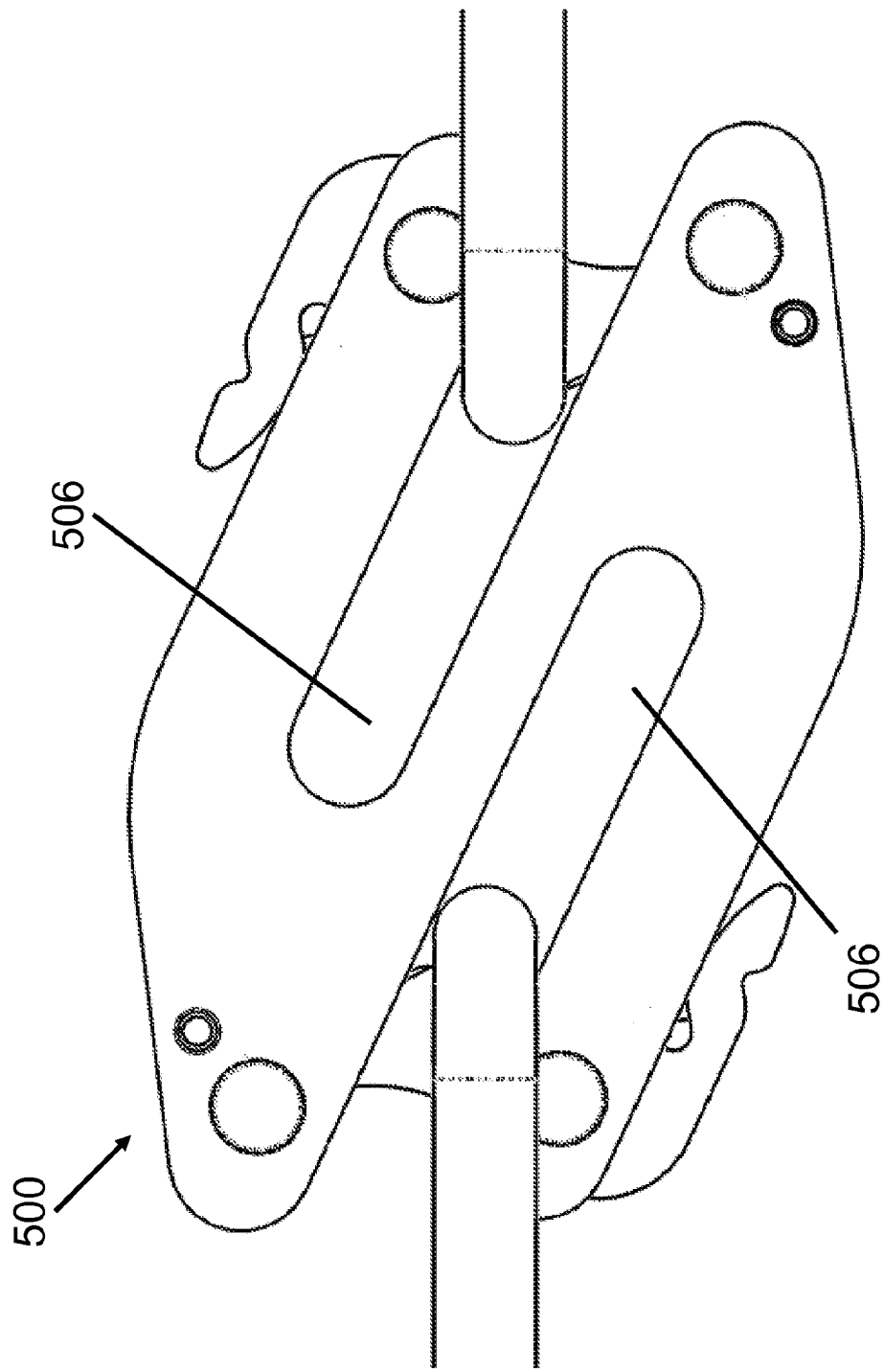

Another specific, non-limiting example of a double-ended coupling link is illustrated in FIGS. 5A, and 5B. FIGS. 5A and 5B illustrate a side view (FIG. 5A) of an exemplary double-ended connector link in a closed position, and a perspective view (FIG. 5B) of the same double-ended connector link in a closed position with two chain links attached, in accordance with various embodiments. In the illustrated example, apertures 506 may be angled with respect to one another, for instance to minimize the length of the coupling link 500.

Figure 6:
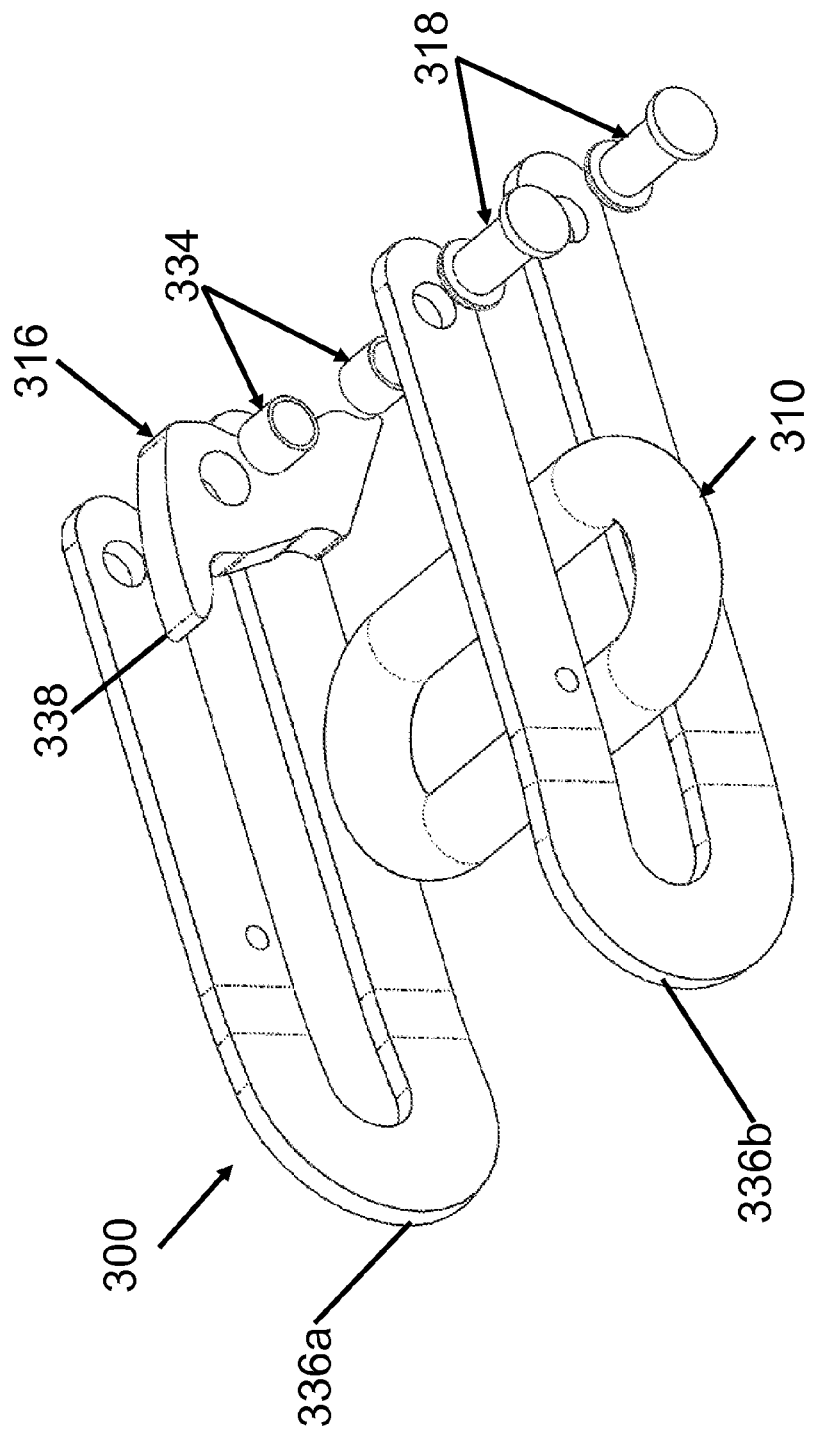
FIG. 6 shows an exploded view of the exemplary two-piece connector link shown in FIGS. 3A-F, in accordance with various embodiments.

FIG. 6 shows an exploded view of the exemplary two-piece connector link 300 shown in FIGS. 3A-F, in accordance with various embodiments. As shown in FIG. 6, in various embodiments, one or more spacers 334 may be positioned between the adjacent flat bar portions 336a, 336b in order to, for example, maintain a desired spacing, control the pinch points, anchor a retaining member 316, etc. In various embodiments, the retaining member may have a protrusion 338 that may be engaged by, for example, a user's finger or thumb, to allow for controlled actuation of the retaining member. Also shown are pivot points 318 and a chain link 310.

Figure 7:
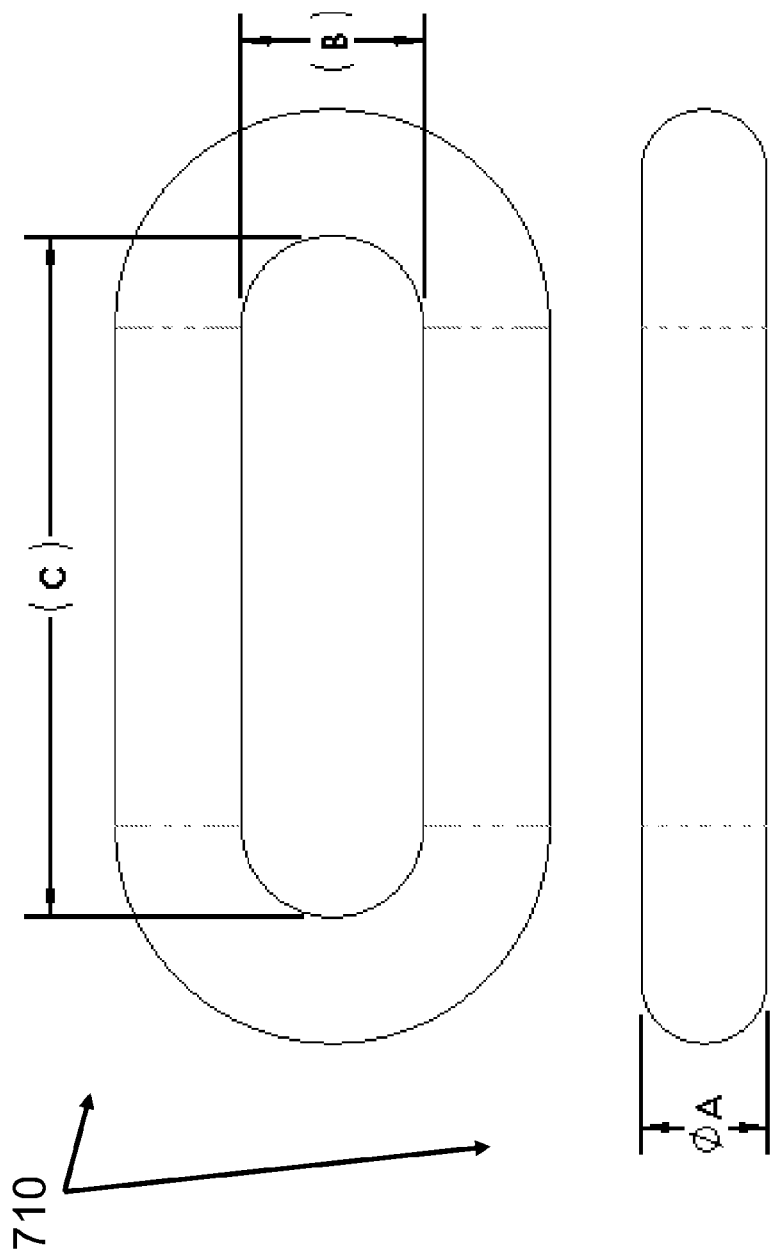
FIG. 7 illustrates a perspective view (top) and a side view (bottom) of an exemplary chain link, in accordance with various embodiments.

FIG. 7 illustrates a perspective view (top) and a side view (bottom) of an exemplary chain link 710 that may be used with the disclosed connector links. Table 1, below, illustrates some exemplary dimensional relations of this specific, non-limiting example. For the purposes of the exemplary parametric relationships described in the tables below, the example coupling links were designed structurally and functionally for the exemplary purpose of coupling two pieces of chain link together with a proximal release ability. In these specific, non-limiting examples, the structural aspects of the coupled system were stress analyzed on the assumption that the two link sets would be pulling inline and in tension against the coupling link. The exemplary coupling links also were built using materials with similar material property values. Thus, in these examples, if the attaching chain links are constructed of non-heat treated mild steel with a low yield strength, the coupling links may also be made using similar materials or stronger materials. For instance, in one specific, non-limiting example, the coupling link may be constructed of a higher grade of aluminum rather than steel (for instance, with one or more special coatings to prevent galvanic corrosion) because of the higher yield strengths. In other exemplary embodiments, if the chain links are made from a heat treated alloy steel, then the connecting link also may be constructed from similar (or stronger) high strength steels or titanium, for instance. These combinations of materials are provided as examples for illustration purposes only, and one of skill in the art will appreciate that other materials and combinations of materials may be selected to suit a particular application.

TABLE 1

Exemplary Chain Link Dimension Functional Relations

| KEY DIMENSION | DIMENSION DESCRIPTION | DIMENSION FUNCTIONAL RELATIONSHIP | ALLOWABLE TOLERANCE |
| --- | --- | --- | --- |
| ØA | MATERIAL DIAMETER | BASELINE-DRIVING DIM | ±(ØA)(.03) |
| B | INTERNAL WIDTH | BASELINE-DRIVING DIM | ±(B)(.03) |
| C | INTERNAL LENGTH | BASELINE-DRIVING DIM | ±(C)(.05) |

Figure 8:
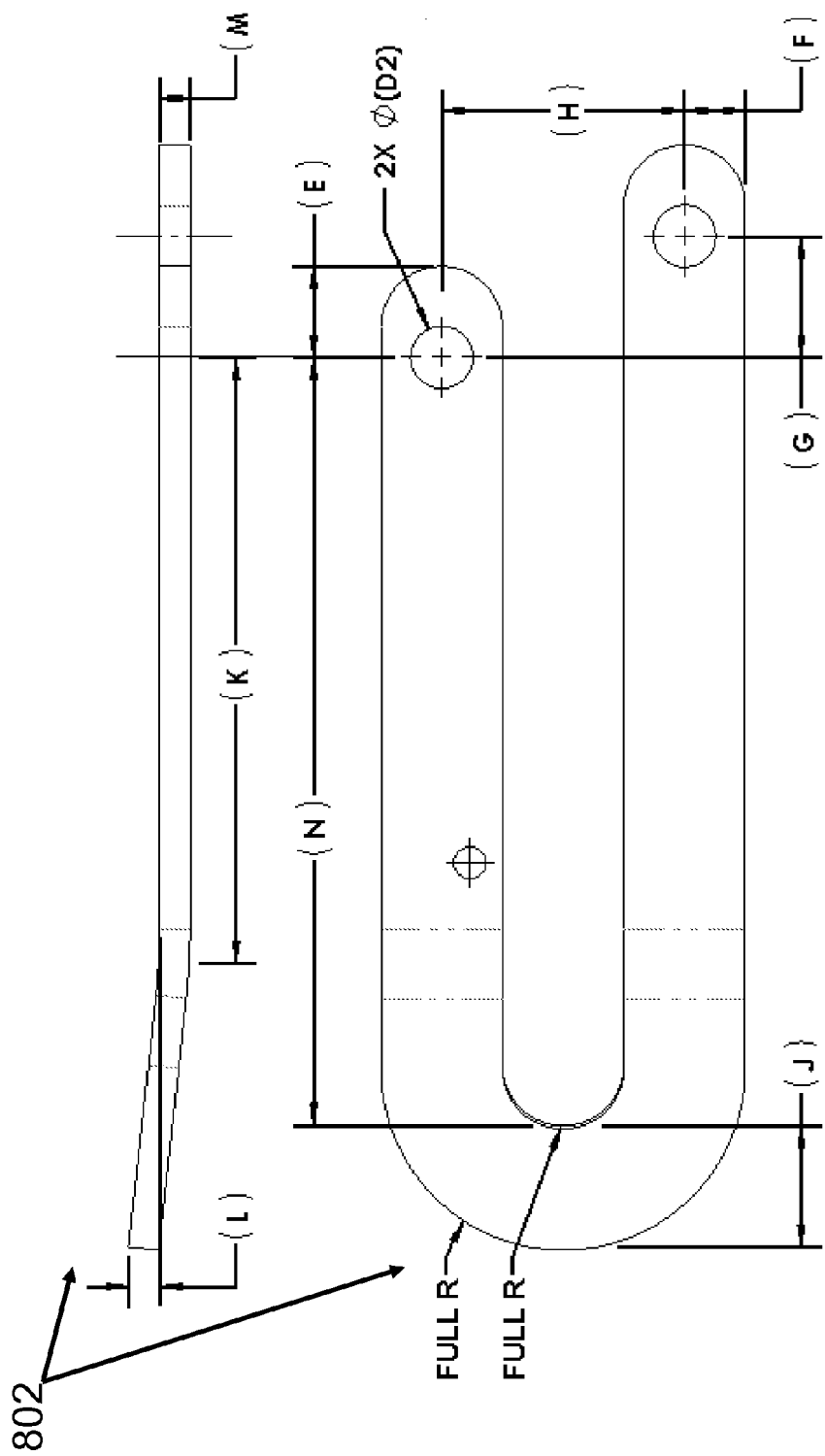
FIG. 8 illustrates a side view (top) and a face view (bottom) of an exemplary side of a two-part connector link body member, in accordance with various embodiments.

FIG. 8 illustrates a side view (top) and a face view (bottom) of an exemplary side of a two-part connector link body member 802. Table 2, below, illustrates some exemplary dimensional relations of this specific, non-limiting example.

TABLE 2

Exemplary Body Dimension Functional Relations

| KEY DIMENSION | DIMENSION DESCRIPTION | DIMENSION FUNCTIONAL RELATIONSHIP (NOMINAL) | ALLOWABLE TOLERANCE | DIMENSION DRIVING FACTOR |
|---|---|---|---|---|
| ØD2 | THRU HOLE DIAMETER | ØD2 = (ØA)(0.6) | +(ØD2)(0.02) −0.0 | THRU PIN DOUBLE SHEAR STRENGTH |
| E | THRU HOLE HORIZONTAL EDGE DISTANCE | E = (ØD2)(1.5) | +(E)(0.05) −0.0 | SHEAR TEAR OUT STRENGTH AND CONTACT/BEARING |
| F | THRU HOLE VERTICAL EDGE DISTANCE | F = (ØD2) | +(F)(0.05) −0.0 | CROSS HOLE TENSILE STRENGTH |
| G | UPPER TO LOWER THRU HOLE HORIZONTAL DISTANCE | G = (B)(1.2) | ±(H)(0.03) | 90° CHAIN LINK AUTO-SLIDE RELEASE |
| H | UPPER TO LOWER THRU HOLE VERTICAL DISTANCE | H = (B)(2.4) | ±(G)(0.03) | CHAIN LINK CLEARANCE FOR INTALLATION AND RELEASE |
| J | AFT BODY EDGE DISTANCE | J = (B)(1.2) | ±(J)(0.05) | SHEAR TEAR OUT STRENGTH |
| K | UPPER THRU HOLE TO BEND LINE DISTANCE | K = (ØA)(6.0) | ±(K)(0.10) | CLEARANCE FOR EXTENSION SPRING TO RETURN TRIGGER |
| L | TOTAL BEND LINE DEFLECTION | L = (ØA)(0.32) | ±(L)(0.02) | STANDOFF BUSHING CLEARANCE |
| M | MATERIAL THICKNESS | F = (ØD2) | ±(F)(0.05) | SHEAR, TENSILE AND CONTACT/BEARING STRENGTH |
| N | UPPER THRU HOLE TO BODY INNER RADIUS DISTANCE | N = (ØA)(7.6) | ±(N)(0.10) | CLEARANCE FOR TWO CONNECTING CHAIN LINKS |

Figure 9:
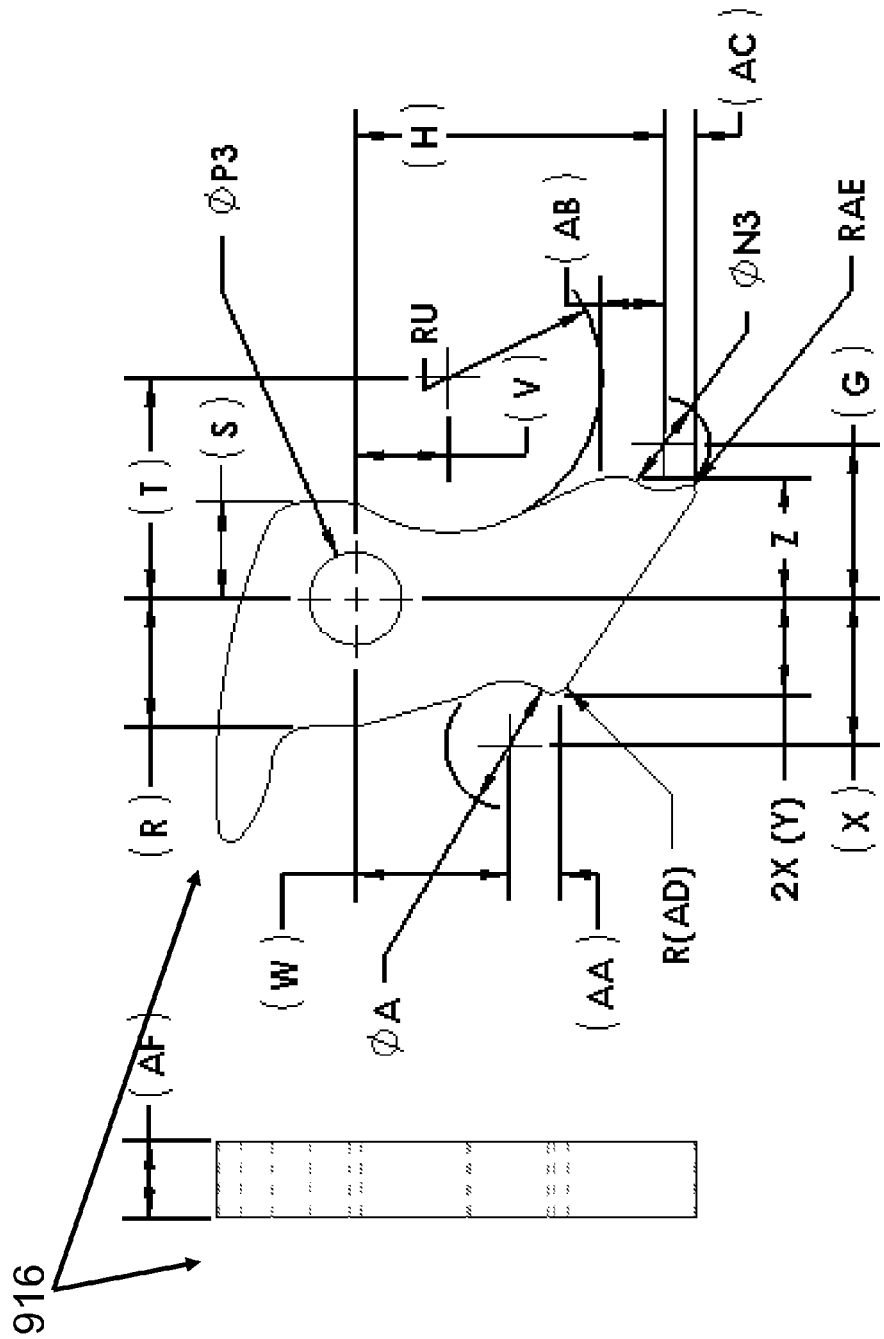
FIG. 9 illustrates a side view (left) and a face view (right) of an exemplary latch member, in accordance with various embodiments.

FIG. 9 illustrates a side view (left) and a face view (right) of an exemplary latch member 916. Table 3, below, illustrates some exemplary dimensional relations of this specific, non-limiting example.

TABLE 3

Exemplary Latch Member Dimension Functional Relations

| KEY DIMENSION | DIMENSION DESCRIPTION | DIMENSION FUNCTIONAL RELATIONSHIP (NOMINAL) | ALLOWABLE TOLERANCE | DIMENSION DRIVING FACTOR |
|---|---|---|---|---|
| ØN3 | BUSHING CUT DIAMETER | ØN3 = (ØA)(0.75) | ±(ØN3)(0.02) | CONTACT/BEARING STRENGTH |
| ØP3 | THRU HOLE DIAMETER | ØP3 = (ØA)(0.72) | +(ØP3)(0.01) −0.0 | STANDOFF BUSHING DIAMETRICAL CLEARANCE |
| R | THRU HOLE LH-UPPER HORIZONTAL EDGE DISTANCE | R = (ØA1) | ±(R)(0.03) | SHEAR TEAR OUT AND CONTACT/BEARING STRENGTH |
| S | THRU HOLE RH HORIZONTAL EDGE DISTANCE | S = (ØA1)(0.75) | ±(S)(0.03) | ROTATIONAL CLEARANCE AND CONTACT/BEARING STRENGTH |
| T | THRU HOLE TO RH CLEARANCE CUT HORIZONTAL DISTANCE | T = (B)(1.16) | ±(T)(0.03) | CLEARANCE FOR 90° CHAIN LINK AUTO-SLIDE RELEASE |
| ØU | RH CLEARANCE CUT DIAMETER | ØU = (B)(0.80) | ±(ØU)(0.03) | CLEARANCE FOR 90° CHAIN LINK AUTO-SLIDE RELEASE |
| V | THRU HOLE TO RH CLEARANCE CUT VERTICAL DISTANCE | V = (B)(0.48) | ±(V)(0.02) | CLEARANCE FOR 90° CHAIN LINK AUTO-SLIDE RELEASE |
| W | THRU HOLE TO CHAIN LINK CONTACT CUT VERT DISTANCE | W = (ØA)(1.2) | ±(W)(0.5) | CLEARANCE FOR 90° CHAIN LINK AUTO-SLIDE RELEASE |
| X | THRU HOLE TO CHAIN LINK CONTACT CUT HORIZ DISTANCE | X = (ØX)(1.15) | ±(X)(0.02) | DEPTH OF CUT FOR CONTACT/BEARING STRENGTH |
| Y | THRU HOLE TO LH-LOWER HORIZONTAL EDGE DISTANCE | Y = (B)(0.5) | ±(Y)(0.03) | BENDING STRENGTH & 90° CHAIN LINK AUTO-SLIDE RELEASE |
| Z | THRU HOLE TO RH-LOWER HORIZONTAL EDGE DISTANCE | Z = (B)(0.63) | ±(Z)(0.03) | CLEARANCE FOR TWO CONNECTING CHAIN LINKS |
| AA | LINK CONTACT CUT TO LH-LOWER EDGE VERT DISTANCE | AA = (B)(0.30) | ±(AA)(0.03) | CLEARANCE FOR 90° CHAIN LINK AUTO-SLIDE RELEASE |
| AB | BUSHING CONTACT CUT TO RH-UPPER EDGE VERT DISTANCE | AB = (ØA1)(0.5) | ±(AB)(0.03) | BENDING STRENGTH & 90° CHAIN LINK AUTO-SLIDE RELEASE |
| AC | BUSHING CONTACT CUT TO RH-LOWER EDGE VERT DISTANCE | AC = (B)(0.18) | ±(AC)(0.02) | CLEARANCE FOR 90° CHAIN LINK AUTO-SLIDE RELEASE |
| R(AD) | LH-LOWER EDGE CORNER RADIUS | R(AD) = (ØA1)(3)/(B) | ±R(AD)(0.05) | CLEARANCE FOR 90° CHAIN LINK AUTO-SLIDE RELEASE |

Figure 10:
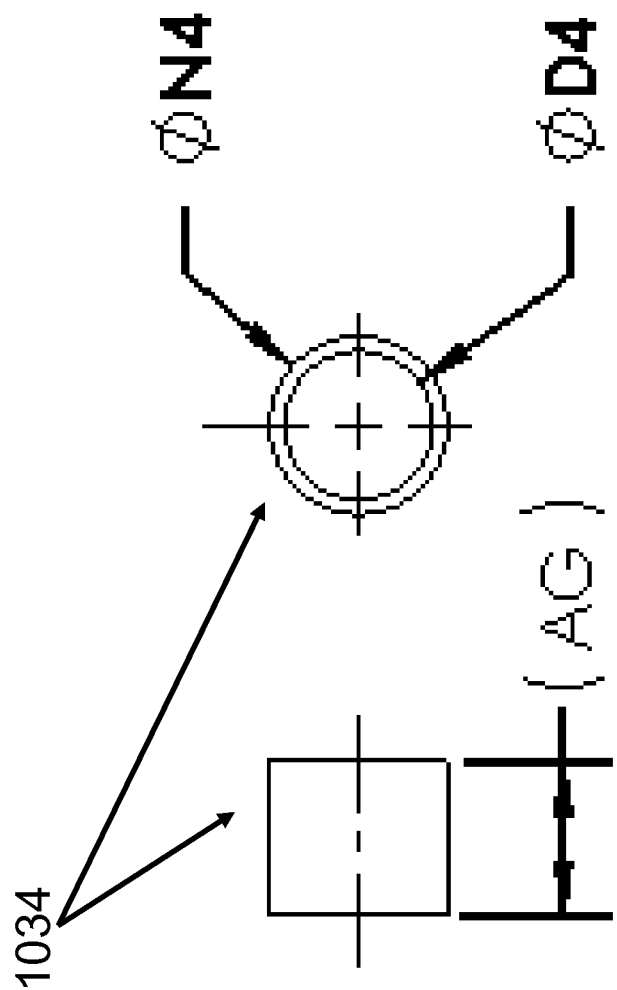
FIG. 10 illustrates a side view (left) and a cross-sectional view (right) of an exemplary bushing/spacer, in accordance with various embodiments.

FIG. 10 illustrates a side view (left) and a cross-sectional view (right) of an exemplary bushing/spacer 1034. Table 4, below, illustrates some exemplary dimensional relations of this specific, non-limiting example.

TABLE 4

Exemplary Bushing/Spacer Dimension Functional Relations

| KEY DIMENSION | DIMENSION DESCRIPTION | DIMENSION FUNCTIONAL RELATIONSHIP (NOMINAL) | ALLOWABLE TOLERANCE | DIMENSION DRIVING FACTOR |
|---|---|---|---|---|
| ØD4 | THRU HOLE DIAMETER | ØD4 = (ØA)(0.6) | +(ØD4)(0.02) −0.0 | THRU PIN/RIVET CLEARANCE |
| ØN4 | OUTSIDE DIAMETER | ØN4 = (ØA)(0.75) | +0.0 −(ØN4)(.01) | CONTACT/BEARING STRENGTH |
| AG | LENGTH | AG = (ØA)(.63) | ±(AG)(0.02) | TRIGGER WIDTH CLEARANCE |

Figure 11:
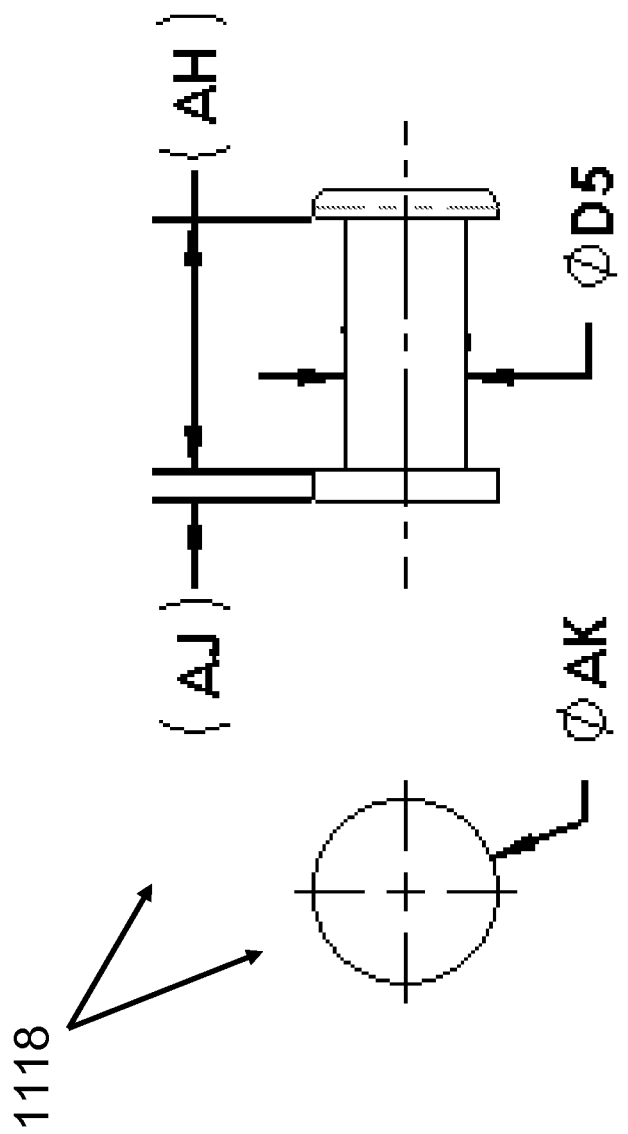
FIG. 11 illustrates a cross-sectional view (left) and a side view (right) of an exemplary pin/rivet for use as a pivot point, in accordance with various embodiments.

FIG. 11 illustrates a cross-sectional view (left) and a side view (right) of an exemplary pivot point 1118 pin/rivet. Table 5, below, illustrates some exemplary dimensional relations of this specific, non-limiting example.

TABLE 5

Exemplary Pin/Rivet Dimension Functional Relations

| KEY DIMENSION | DIMENSION DESCRIPTION | DIMENSION FUNCTIONAL RELATIONSHIP (NOMINAL) | ALLOWABLE TOLERANCE | DIMENSION DRIVING FACTOR |
|---|---|---|---|---|
| ØD5 | SHANK DIAMETER | ØD5 = (ØA)(0.6) | +0.0 −(ØD5)(0.01) | THRU PIN/RIVET CLEARANCE |
| AH | SHANK WIDTH | AH = (AG) + (2.0)(M) | +(AG)(.05) −0.0 | CONTACT/BEARING STRENGTH |
| AJ | HEAD WIDTH | AJ = (ØA)(.02) | ±(AJ)(0.3) | TENSILE STRENGTH |
| AK | HEAD DIAMETER | AK = (ØD5)(1.5) | ±(AK)(0.3) | CONTACT/BEARING STRENGTH |

In some embodiments, particular dimensional ratios between the connector link and the chain link may be advantageous. For instance, it may be appreciated that the longitudinal side-to-side interior length of the chain link may be (B+2*A)=Ć (see, e.g., chain link 710 in FIG. 7), and this length may be, in embodiments, smaller than the upper through hole to body inner radius distance N of the connector link (see, e.g., body portion 802 in FIG. 8). For instance, this ratio may be 1:1.1 or more, in particular embodiments. In various embodiments, N/Ć can be as large as needed; the depth of the slot, N, may be driven primarily by the distance required to allow the transverse/proximal (90 degree) auto release of the chain link when there is a second link of chain already attached. In other embodiments, for instance, when the connector link is coupling to two or more chain links, it may be advantageous to for the upper through hole to body inner radius distance N (see, e.g., FIG. 8) to be large enough to accommodate both the material diameter A of the chain link and the side-to-side width of the chain link (see, e.g., chain link 710 in FIG. 7). In even more particular embodiments, for instance when the connector link is removably coupling to two or more chain links, it may be advantageous to for the upper through hole to body inner radius distance N (see, e.g., FIG. 8) to be large enough to accommodate the material diameter A of the chain link, the side-to-side width of the chain link (see, e.g., FIG. 7), and the clearance distance between the latch member distal tip and the through hole (see, e.g., FIG. 9).

In still other embodiments, the ratio of the internal width B of the chain link (see, e.g., FIG. 7) and the aft body edge distance J (see, e.g., FIG. 8) may be selected to control whether the attached chain link may pass around the perimeter of the connector link. For instance, the ratio may be from about 1:1.1 to about 1:2 if it is desirable to prevent the chain link from passing around the perimeter of the connector link.

In other embodiments, the ratio may be from about 1.1:1 to about 2:1 if it is desirable to allow the chain link to pass around the perimeter of the connector link freely.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope of the present invention. Those with skill in the art will readily appreciate that embodiments in accordance with the present invention may be implemented in a very wide variety of ways. This application is intended to cover any adaptations or variations of the embodiments discussed herein. Therefore, it is manifestly intended that embodiments in accordance with the present invention be limited only by the claims and the equivalents thereof.

I claim:

1. A connector link having a body, an aperture, a first end, and a second end;
    wherein the first end comprises a first opening adapted to allow a portion of a first chain link member to pass therethrough and into the aperture;
    wherein the first end further comprises a first retaining member adapted to open to allow the portion of the first chain link member to pass through the first opening and further adapted to form a first closure across the first opening once the portion of the first chain link member has passed through the first opening, thereby coupling the first chain link member to the connector link;
    wherein the first retaining member is adapted to receive tension from the coupled first chain link member;
    wherein the first retaining member is adapted to increase the strength of the first closure when the coupled first chain link member applies tension thereto; and
    wherein the first retaining member comprises a protrusion adapted to facilitate manual opening of the first retaining member.

2. The connector link of claim 1, further comprising a first biasing member adapted to bias the first retaining member into a closed position.

3. The connector link of claim 2, wherein the first biasing member is a flat spring, a coil spring, a clock spring, a magnet, or an elastomer.

4. The connector link of claim 1, wherein the first retaining member is a low profile retaining member adapted to be used in a low-clearance environment.

5. The connector link of claim 1, wherein the aperture has a maximum dimension that is sized to allow sufficient clearance for the portion of the first chain link member to pass beyond a distal tip of the first retaining member when the first retaining member is in an open position.

6. The connector link of claim 5, wherein the first aperture has a maximum dimension that is sized to allow sufficient clearance for two opposing side members of the first chain link member to pass beyond the distal tip of the first retaining member when the first retaining member is in an open position.

7. The connector link of claim 1, wherein the second end comprises a second opening adapted to allow a portion of a second chain link member to pass therethrough and into the aperture;
 wherein the second end further comprises a second retaining member adapted to open to allow the portion of the second chain link member to pass through the second opening and further adapted to form a second closure across the second opening once the portion of the second chain link member has passed through the second opening, thereby coupling the second chain link member to the coupling link;
 wherein the second retaining member is adapted to receive tension from the coupled second chain link member; and
 wherein the second retaining member is adapted to increase the strength of the second closure when the coupled second chain link member applies tension thereto.

8. The connector link of claim 7, further comprising a second biasing member adapted to bias the second retaining member into a closed position.

9. The connector link of claim 8, wherein the second biasing member is a flat spring, a coil spring, a clock spring, a magnet, or an elastomer.

10. The connector link of claim 7, wherein the second retaining member is a low profile retaining member adapted to be used in a low-clearance environment.

11. The connector link of claim 7, wherein the second retaining member comprises a protrusion adapted to facilitate manual opening of the second retaining member.

12. The connector link of claim 7, wherein the body comprises a cross member spanning the aperture.

13. The connector link of claim 7, wherein the connector link comprises two or more apertures.

14. The connector link of claim 13, wherein the two or more apertures are offset with regard to one another.

15. The connector link of claim 7, wherein the aperture has a maximum dimension that is sized to allow sufficient clearance for the portion of the second chain link member to pass beyond a distal tip of the second retaining member when the second retaining member is in an open position.

16. The connector link of claim 15, wherein the aperture has a maximum dimension that is sized to allow sufficient clearance for two opposing side members of the second chain link member to pass beyond the distal tip of the second retaining member when the second retaining member is in an open position.

17. The connector link of claim 1, wherein the body is a one-piece body.

18. The connector link of claim 1, wherein the body is a two-piece body.

* * * * *